United States Patent
Huang et al.

(10) Patent No.: US 11,108,045 B2
(45) Date of Patent: Aug. 31, 2021

(54) HOST MATERIAL FOR STABILIZING LITHIUM METAL ELECTRODE, AND FABRICATING METHOD AND APPLICATIONS OF SAME

(71) Applicant: NORTHWESTERN UNIVERSITY, Evanston, IL (US)

(72) Inventors: Jiaxing Huang, Wilmette, IL (US); Jiayan Luo, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 15 days.

(21) Appl. No.: 16/341,484

(22) PCT Filed: Oct. 24, 2017

(86) PCT No.: PCT/US2017/057993
§ 371 (c)(1),
(2) Date: Apr. 12, 2019

(87) PCT Pub. No.: WO2018/081055
PCT Pub. Date: May 3, 2018

(65) Prior Publication Data
US 2019/0305309 A1    Oct. 3, 2019

Related U.S. Application Data
(60) Provisional application No. 62/411,798, filed on Oct. 24, 2016.

(51) Int. Cl.
*H01M 4/02*    (2006.01)
*H01M 4/587*    (2010.01)
(Continued)

(52) U.S. Cl.
CPC ........... *H01M 4/587* (2013.01); *C01B 32/184* (2017.08); *H01M 10/0525* (2013.01);
(Continued)

(58) Field of Classification Search
CPC ....................................................... H01M 4/02
See application file for complete search history.

(56) References Cited

U.S. PATENT DOCUMENTS

| | | | |
|---|---|---|---|
| 2013/0344392 A1* | 12/2013 | Huang | C01B 32/194 |
| | | | 429/231.8 |
| 2014/0057113 A1 | 2/2014 | Zhao et al. | |
| 2015/0380176 A1 | 12/2015 | Seo et al. | |

OTHER PUBLICATIONS

Jacobson, A., Chianelli, R. & Whittingham, M. Amorphous molybdenum disulfide cathodes. J. Electrochem. Soc. 126, 2277-2278 (1979).

(Continued)

*Primary Examiner* — Jacob B Marks
(74) *Attorney, Agent, or Firm* — Locke Lord LLP; Tim Tingkang Xia, Esq.

(57) ABSTRACT

The invention relates to a host material for stabilizing a Li metal electrode, fabricating methods and applications of the same. The host material includes crumpled graphene balls operably defining a scaffold having volumes and voids inside and in between the crumpled graphene balls so as to allow uniform and stable Li deposition/dissolution inside and in between the crumpled graphene balls without electrode volume fluctuations or with sufficiently small electrode volume fluctuations. The crumpled paper ball-like structures of graphene particles can readily assemble to yield the scaffold with scalable Li loading up to 10 mAh cm-2 within tolerable volume fluctuations. High Coulombic efficiency of 97.5% over 750 cycles (1500 hours) is achieved. Plating/stripping Li up to 12 mAh cm-2 on the crumpled graphene scaffold does not experience dendrite growth.

20 Claims, 22 Drawing Sheets

(51) Int. Cl.
*C01B 32/184* (2017.01)
*H01M 10/0525* (2010.01)

(52) U.S. Cl.
CPC ...... *C01B 2204/22* (2013.01); *C01B 2204/26* (2013.01); *C01B 2204/32* (2013.01); *C01P 2004/03* (2013.01); *C01P 2004/04* (2013.01); *C01P 2004/34* (2013.01); *C01P 2004/62* (2013.01); *C01P 2006/12* (2013.01); *C01P 2006/14* (2013.01); *C01P 2006/21* (2013.01); *C01P 2006/40* (2013.01); *H01M 2004/021* (2013.01)

(56) References Cited

OTHER PUBLICATIONS

Adams, W. A., Donaldson G. J. & Stiles J. A. R. Power Sources 10. London: The Paul Press Ltd, p. 69, (1984).
Whittingham, M. S. Electrical energy storage and intercalation chemistry. Science 192, 1126-1127 (1976).
Tarascon, J. M. & Armand, M. Issues and challenges facing rechargeable lithium batteries. Nature 414, 359-367 (2001).
Peled, E. The electrochemical behavior of alkali and alkaline earth metals in nonaqueous battery systems—the solid electrolyte interphase model. J. Electrochem. Soc. 126, 2047-2051 (1979).
Lu, Y., Tu, Z. & Archer, L. A. Stable lithium electrodeposition in liquid and nanoporous solid electrolytes. Nat. Mater. 13, 961-969 (2014).
Suo, L., Hu, Y. S., Li, H., Armand, M. & Chen, L. A new class of solvent-in-salt electrolyte for high-energy rechargeable metallic lithium batteries. Nat. commun. 4, 1481 (2013).
Ding, F, et al. Dendrite-free lithium deposition via self-healing electrostatic shield mechanism. J. Am. Chem. Soc. 135, 4450-4456 (2013).
Zheng, G, et al. Interconnected hollow carbon nanospheres for stable lithium metal anodes. Nat. nanotech. 9, 618-623 (2014).
Kim, J. S., Kim, D. W., Jung, H. T. & Choi, J. W. Controlled lithium dendrite growth by a synergistic effect of multilayered graphene coating and an electrolyte additive. Chem. Mater. 27, 2780-2787 (2015).
Yan, K. et al. Ultrathin two-dimensional atomic crystals as stable interfacial layer for improvement of lithium metal anode. Nano Lett. 14, 6016-6022 (2014).
Liang, Z. et al. Polymer nanofiber-guided uniform lithium deposition for battery electrodes. Nano Lett. 15, 2910-2916 (2015).
Cheng, X. B. et al. Dendrite-Free lithium deposition induced by uniformly distributed Lithium-ions for efficient lithium metal batteries. Adv. Mater. 28, 2888-2895 (2016).
Bittihn, R., Herr, R. & Hoge, D. The SWING system, a nonaqueous rechargeable carbon/metal oxide cell. J. Power Sources 43, 223-231 (1993).
Sawai, K., Iwakoshi, Y. & Ohzuku, T. Carbon materials for lithium-ion (shuttlecock) cells. Solid State Ionics 69, 273-283 (1994).
Nagaura, T. & Tozawa, K. Lithium ion rechargeable battery. Prog. Batteries Sol. Cells 9, 209 (1990).
Armand, M. & Tarascon, J. M. Building better batteries. Nature 451, 652-657 (2008).
Whittingham, M. S. Lithium batteries and cathode materials. Chem. Rev. 104, 4271-4302 (2004).
Idota, Y. Kubota, T., Matsufuji, A., Maekawa, Y. & Miyasaka, T. Tin-based amorphous oxide: a high-capacity lithium-ion-storage material. Science 276, 1395-1397 (1997).
Boukamp, B., Lesh, G. & Huggins, R. All-solid lithium electrodes with mixed-conductor matrix. J. Electrochem. Soc. 128, 725-729 (1981).
Chan, C. K. et al. High-performance lithium battery anodes using silicon nanowires. Nat. nanotech. 3, 31-35 (2008).

Mizushima, K., Jones, P., Wiseman, P. & Goodenough, J. $Li_xCoO_2$ ($0<x<1$): A new cathode material for batteries of high energy density. Mater. Res. Bull. 15, 783-789 (1980).
Padhi, A. K. and Goodenough, J. B. Phospho-olivines as positive-electrode materials for rechargeable lithium batteries. J. Electrochem. Soc. 144, 1188-1194 (1997).
Broussely, M., Biensan, P. & Simon, B. Lithium insertion into host materials: the key to success for Li ion batteries. Electrochim. Acta 45, 3-22 (1999).
Lin, D. et al. Layered reduced graphene oxide with nanoscale interlayer gaps as a stable host for lithium metal anodes. Nat. nanotech. 11, 626-632 (2016).
Korean Intellectual Property Office (ISR/KR), "International Search Report for PCT/US2017/057993", Korea, dated Sep. 7, 2018.
Liang, Zheng et al., "Composite lithium metal anode by melt infusion of lithium into a 3D conducting scaffold with lithiophilic coating", PNAS, Mar. 15, 2016, col. 113, No. 11, pp. 2862-2867.
Zhao, Yunlong et al., "Self-adaptive strain-relaxation optimization for high-energy lithium storage material through crumpling of graphene", Nature Communications, Aug. 1, 2014, vol. 5, Article No. 4565, pp. 1-8.
Yang, C. P., Yin, Y. X., Zhang, S.F., Li, N. W.& Guo, Y. G. Accommodating lithium into 3D current collectors with a submicron skeleton towards long-life lithium metal anodes. Nat. commun. 6, 8058 (2015).
Yun, Q. et al. Chemical dealloying derived 3D porous current collector for Li metal anodes. Adv. Mater. 28, 6932-6939 (2016).
Chu, S. & Cui, Y. Selective deposition and stable encapsulation of lithium through heterogeneous seeded growth. Nature Energy 1, 16010 (2016).
Liu, Y., Lin, D., Liang, Z., Zhao, J., Yan, K. & Cui, Y. Lithium-coated polymeric matrix as a minimum volume-change and dendrite-free lithium metal anode. Nat. commun. 7, 10992 (2016).
Sun, Y., Liu, N. & Cui Y. Promises and challenges of nanomaterials for lithium-based rechargeable batteries. Nature Energy 1, 16071 (2016).
Lu, L. L. et al. Free-standing copper nanowire network current collector for improving lithium anode performance. Nano lett. 16, 4431-4437 (2016).
Aurbach, D., Zinigrad, E., Cohen, Y. & Teller, H. A short review of failure mechanisms of lithium metal and lithiated graphite anodes in liquid electrolyte solutions. Solid State Ionics 148, 405-416 (2002).
Bieker, G., Winter, M. & Bieker, P. Electrochemical in situ investigations of SEI and dendrite formation on the lithium metal anode. Phy. Chem. Chem. Phy. 17, 8670-8679 (2015).
Zhang, R. et al. Conductive nanostructured scaffolds render low local current density to inhibit lithium dendrite growth. Adv. Mater. 28, 2155-2162 (2016).
Liang, Z. et al. Composite lithium metal anode by melt infusion of lithium into a 3D conducting scaffold with lithiophilic coating. Proc. Natl. Acad. Sci.U. S. A. 113, 2862-2867 (2016).
Luo, L. L., Wu, J. S., Luo, J. Y., Huang, J. X. & Dravid, V. P. Dynamics of electrochemical lithiation/delithiation of graphene-encapsulated silicon nanoparticles studied by in-situ TEM. Sci. Rep. 4, 3863 (2014).
Luo, J. Y. et al. Compression and aggregation-resistant particles of crumpled soft sheets. ACS Nano 5, 8943-8949 (2011).
Ko, M. S., Chae, S. J., Ma, J. Y., Kim, N. H., Lee, H. W., Cui, Y. & Cho, J. Scalable synthesis of silicon-nanolayer-embedded graphite for high-energy Lithium-ion batteries. Nature Energy 1, 16113 (2016).
Hummers, W. S. & Offeman, R. E. Preparation of graphitic oxide. J. Am. Chem. Soc. 80, 1339-1342 (1958).
W. Xu, J. L. Wang, F. Ding, X. L. Chen, E. Nasybulin, Y. H. Zhang, J. G. Zhang, Energy Environ. Sci. 2014, 7, 513-537.
K. Zhang, G. H. Lee, M. Park, W. Li, Y. M. Kang, Adv. Energy Mater. 2016, 6, 1600811.
J. B. Goodenough, Acc. Chem. Res. 2013, 46, 1053-1061.
X. Dou, A. R. Kolyonow, X. L. He, H. D. Jang, Q. Wang, Y. -W. Chung, J. X. Huang, Proc. Natl. Acad. Sci. 2016, 113, 1528-1533.
J. Y. Luo, J. Kim, J. X. Huang, Acc. Chem. Res. 2013, 46, 2225-2234.
J. Y. Luo, H. D. Jang, J. X. Huang. ACS Nano 2013, 7, 1464-1471.

(56) References Cited

OTHER PUBLICATIONS

J. Smith, Y. H. Chang, K. Raidongia, T. Y. Chen, L. J. Li, J. Huang, Adv. Energy Mater. 2014, 4, 59-62.
J. Y. Luo, J. Gao, A. X. Wang, J. X. Huang, ACS Nano 2015, 9, 9432-9436.
R. Zhang, X. R. Chen, X. Chen, X. B. Cheng, X.Q. Zhang, C. Yan, Q. Zhang, Angew. Chem. Int. Ed. 2017, 56 (27), 7764-7768.
M. D. Tikekar, S. Choudhury, Z. Tu, L. A. Archer, Nature Energy 2016, 1, 16114.
Z. Tu, M. J. Zachman, S. Choudhury, S. Wei, Y. Yang, L. F. Kourkoutis, L. A. Archer, Adv. Energy Mater. 2017, 7, 1602367.
T. T. Zuo,; X.W. Wu, C.P. Yang, Y.X. Yin, H. Ye, N.W. Li, Y. G. Guo, Advanced Materials 2017, 29 (29), 1700389.

* cited by examiner

HOST MATERIAL FOR STABILIZING LITHIUM METAL ELECTRODE, AND FABRICATING METHOD AND APPLICATIONS OF SAME

CROSS-REFERENCE TO RELATED PATENT APPLICATION

This application claims priority to and the benefit of, pursuant to 35 U.S.C. § 119(e), of U.S. provisional patent application Ser. No. 62/411,798, filed Oct. 24, 2016, entitled "ENERGY STORAGE, MATERIALS, LI ION BATTERIES," by Jiaxing Huang et al., which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference is individually incorporated by reference. In terms of notation, hereinafter, [n] represents the nth reference cited in the reference list. For example, [36] represents the first reference cited in the reference list, namely, Luo, L. L., Wu, J. S., Luo, J. Y., Huang, J. X. & Dravid, V. P. Dynamics of electrochemical lithiation/delithiation of graphene-encapsulated silicon nanoparticles studied by in-situ TEM. Sci. Rep. 4, 3863 (2014).

STATEMENT AS TO RIGHTS UNDER FEDERALLY-SPONSORED RESEARCH

This invention was made with government support under N00014-13-1-0556 awarded by the Office of Naval Research. The government has certain rights in the invention.

FIELD OF THE INVENTION

The present invention relates generally to energy storage, and more particularly to a host material for stabilizing lithium metal electrode, and fabricating method and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Of all materials that can be used for lithium (Li) battery electrodes, Li metal itself has the highest theoretical capacity of 3860 mAh/g and lowest electrochemical potentials (i.e., −3.04 V vs. standard hydrogen electrode). However, direct use of a Li metal anode is hindered by a number of challenges, especially its tendency to form filaments or dendrite during deposition, which prevents the formation of a stable solid electrolyte interphase (SEI) between Li and the electrolyte, and leads to significant volume fluctuation of the Li layer during deposition/dissolution. This greatly limits the cycling Coulombic efficiency and lifetime of the batteries, and sometimes can even lead to catastrophic, hazardous failure when Li filaments penetrate the separator membrane to short the batteries [1-4, 17, 47-49].

A number of strategies have been developed to address the problems associated with Li filaments. For example, one can make the battery structure more robust by employing solid electrolytes that are not easily pierced by Li dendrites [20, 47, 48], and strengthening the SEI by adjusting the formulation of the liquid electrolytes [5-8]. Alternatively, an ion-permeable blocking layer can be introduced to prevent the growing Li filaments from penetrating the separator [9-11]. However, this does not prevent the fluctuation of the apparent volume of Li metal layer during filament growth/disappearance, which tends to weaken or even delaminate the Li/electrolyte interface or the blocking layers during cycling, thus allowing additional growth of dendrites. In another type of strategy, an insulating porous network made of polymer gels or glass fibers can be added, through which Li filaments can only grow along the tortuous network of pores [12, 13]. Unfortunately, such tortuous Li filaments tend to break and become disconnected from the electrodes during cycling. Using scaffolds can help to minimize volume fluctuation of electrodes. Such host material needs to be porous, electrically conductive, chemically and mechanically stable, and have a low interfacial energy with Li metal for preferential deposition to suppress filament growth. Various porous forms of Cu have been demonstrated as an effective host to support Li [26, 27, 31]. However, the main issue of using Cu is in its high density (8.9 g cm$^3$) in regard to Li (0.53 g cm$^3$), which drastically decreases the overall energy density of the electrode.

Therefore, a heretofore unaddressed need exists in the art to address the aforementioned deficiencies and inadequacies.

SUMMARY OF THE INVENTION

One of the objectives of this invention is to employ a conducting, lightweight and lithiophilic scaffold that operably stabilizes high loading of Li during cycling and avoids its dendritic filament growth, to solve this problem.

In certain aspects, the invention relates to the use of crumpled graphene balls as a non-reactive host for a Li metal anode. Unlike most carbon materials which have weak binding with Li and require modifications such as lithiophilic coating or Li grow seeds, the crumpled graphene balls are lithiophilic with high Li diffusivity. The submicron crumpled ball structure has high external surface to dissipate the effective current density, and more importantly, resists to aggregation or deform even under stress, allowing uniform and stable Li deposition/dissolution inside and in between the balls without much electrode volume fluctuation. As a result, significantly improved electrochemical performance of Li metal anodes is achieved.

One aspect of the present invention relates to a host material for stabilizing a Li metal electrode. The host material includes crumpled graphene balls operably defining a scaffold having volumes and voids inside and in between the crumpled graphene balls so as to allow uniform and stable Li deposition/dissolution inside and in between the crumpled graphene balls without electrode volume fluctuations or with sufficiently small electrode volume fluctuations.

In one embodiment, the crumpled graphene balls are paper ball-like graphene particles and are in submicron sizes.

In one embodiment, the volumes and voids inside and in between the crumpled graphene balls are in submicron sizes.

In one embodiment, the crumpled graphene balls have large surface areas.

In one embodiment, the crumpled graphene balls are resistant to aggregation or deformation.

In one embodiment, the crumpled graphene balls are lithiophilic with high Li diffusivity.

In one embodiment, the crumpled graphene balls are conductive and chemical and mechanical stable.

In one embodiment, in operation, Li ions are reversibly deposited or dissolved within the scaffold.

Another aspect of the present invention relates to a method for forming crumpled graphene balls. In one embodiment, the method includes nebulizing a graphene oxide aqueous dispersion into aerosol droplets; and forming crumpled graphene balls by solvent evaporation induced isotropic compression.

In one embodiment, the method further includes a heat treatment of the formed crumpled graphene balls.

In one embodiment, the crumpled graphene balls are paper ball-like graphene particles and are in submicron sizes.

In one embodiment, the volumes and voids inside and in between the crumpled graphene balls are in submicron sizes.

In one embodiment, the crumpled graphene balls have large surface areas.

In one embodiment, the crumpled graphene balls are resistant to aggregation or deformation.

In one embodiment, the crumpled graphene balls are lithiophilic with high Li diffusivity.

In one embodiment, the crumpled graphene balls are conductive and chemical and mechanical stable.

Yet another aspect of the present invention relates to a Li metal electrode comprising a scaffold formed of a host material comprising crumpled graphene balls, defining volumes and voids inside and in between the crumpled graphene balls, so as to allow uniform and stable Li deposition/dissolution inside and in between the crumpled graphene balls without electrode volume fluctuations or with sufficiently small electrode volume fluctuations.

In one embodiment, the crumpled graphene balls are paper ball-like graphene particles and are in submicron sizes.

In one embodiment, the volumes and voids inside and in between the crumpled graphene balls are in submicron sizes.

In one embodiment, the crumpled graphene balls have large surface areas.

In one embodiment, the crumpled graphene balls are resistant to aggregation or deformation.

In one embodiment, the crumpled graphene balls are lithiophilic with high Li diffusivity.

In one embodiment, the crumpled graphene balls are conductive and chemical and mechanical stable.

In one embodiment, in operation, Li ions are reversibly deposited or dissolved within the scaffold.

A further aspect of the present invention relates to an energy storage device. The energy storage device includes a Li metal electrode as disclosed above.

In one embodiment, the scaffold is a conducting, light-weight and lithiophilic scaffold that operably stabilizes high loading of Li during cycling and avoids its dendritic filament growth.

In one embodiment, the energy storage device has a performance with scalable Li loading up to about 10 mAh $cm^{-2}$ for the Li metal electrode with a thickness of about 120 μm within tolerable volume fluctuation.

In one embodiment, the energy storage device has a performance with a stable Coulombic efficiency of about 97.5% over about 750 cycles.

In one embodiment, the energy storage device has a performance with plating/stripping Li up to about 12 mAh $cm^{-2}$ on the Li metal electrode with a thickness of about 40 μm without dendrite growth.

In one embodiment, the energy storage device is a battery.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

DESCRIPTION OF THE INVENTION

Figure 1:
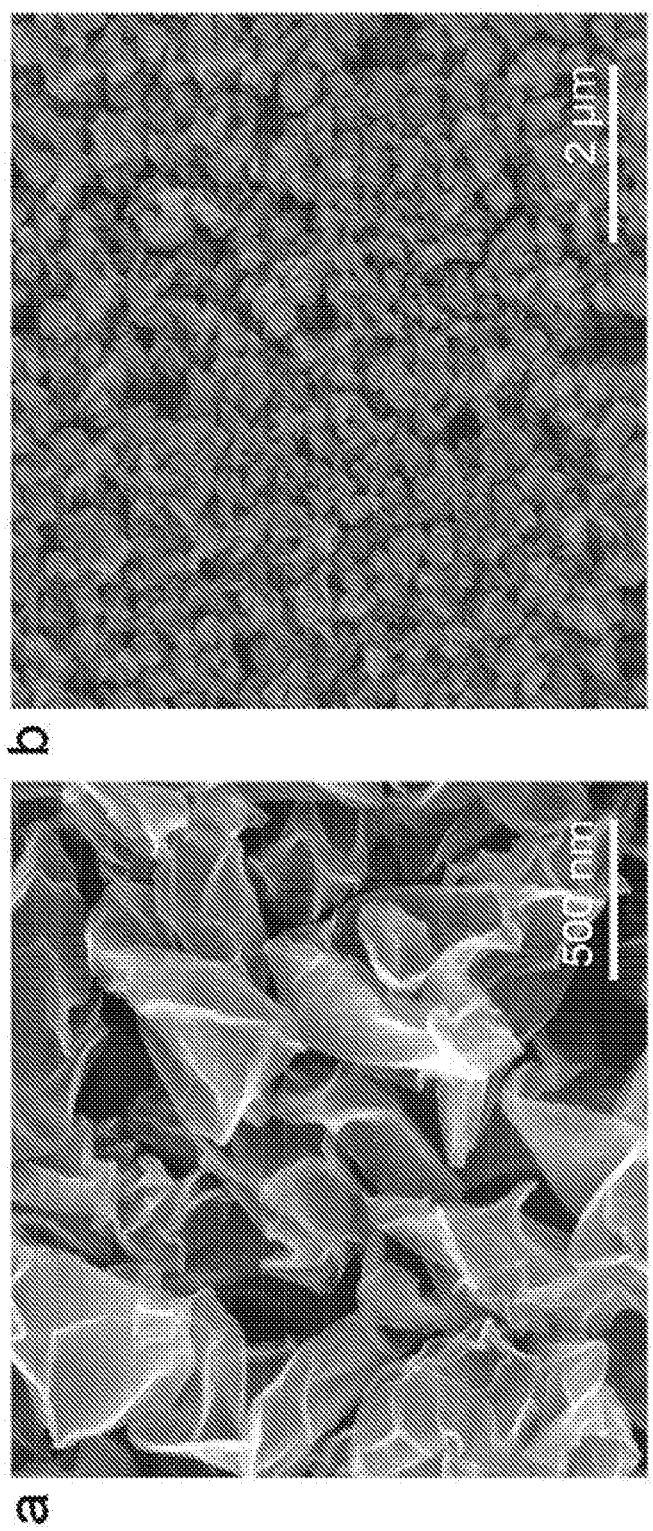
FIG. 1 shows SEM images of crumpled graphene balls (CGB), according to one embodiment of the invention, where panels (a) and (b) are in different scales.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. It should be understood that one or more operations within a method is executed in different order (or concurrently) without altering the principles of the invention.

As used in this disclosure, the term "crumpled graphene balls" and its acronym "CGB" are exchangeable, and refer to crumpled paper ball or ball-like structures of graphene particles, scaled in submicron sizes.

As used in this disclosure, the term "Li@CGB" refers to a crumpled graphene balls (CGB) electrode with lithium (Li) deposition, and the term "Li@Cu" refers to a copper (Cu) electrode with Li deposition.

Embodiments of the invention are illustrated in detail hereinafter with reference to accompanying drawings. It should be understood that specific embodiments described herein are merely intended to explain the invention, but not intended to limit the invention. In accordance with the purposes of this invention, as embodied and broadly described herein, this invention, in certain aspects, relates to crumpled graphene balls stabilized dendrite-free Li metal anodes and fabricating methods and applications of the same.

To store more Li yet to mitigate the volume fluctuation of the electrodes, using non-reactive hosts can be an alternative strategy. The conducting, non-reactive hosts should provide a chemically and mechanically stable scaffold to accommodate high amount of Li deposition/dissolution, but not react with Li. The anode Cu current collectors, which are inert to Li, have recently been fabricated to various porous forms to accommodate Li. The mass of the porous Cu hosts needs to be taken into calculation of the Li storage capacity of the electrodes as the way in reactive hosts because additional non-porous Cu collectors are still required in battery manufacturing to maintain electrode integrity and prevent backside Li deposition. This makes it challenging to start from the dense Cu (8.9 g cm$^{-3}$) whose pore size and structure engineering is important because large pore size cannot constrain dendrite formation while small pore size cannot decrease much of the density (see Table 1 below).

TABLE 1

Comparison of crumpled graphene balls with various porous Cu host materials.

| Host Materials | Density (g/cm$^3$) | Pore Size (μm) | Free Volume (%) | References |
|---|---|---|---|---|
| 3D Cu | 6.94 | 2.1 | 22.0 | Nat. Commun., 2015, 6, 8058 |
| Cu Nanowire membrane | 1.43 | 1-2 | 83.9 | Nano Lett. 2016, 16, 4431 |
| De-alloyed Cu | 5.70 | 0.2-2 | 36.0 | Adv. Mater., 2016, 28, 6932 |
| Crumpled graphene balls | 0.55 | 0.1-0.5 | 75.3 | This invention |

Porous carbon nanostructures, including graphene-based materials are attractive lightweight Li host materials. Carbon nanostructures are suitable non-reactive host materials that need to be lightweight, porous, conducting, chemically and mechanically stable. The low intrinsic density of the carbon nanomaterials and their tunable high porosity allow high capacity of the host included electrodes. High conductivity, chemical and mechanical stability are the foundations for Li reversible deposited/dissolved within the scaffold.

One aspect of the invention discloses a host material for stabilizing a Li metal electrode. In certain embodiments, the host material includes crumpled graphene balls, which operably form a scaffold having volumes and voids inside and in between the crumpled graphene balls so as to allow uniform and stable Li deposition/dissolution inside and in between the crumpled graphene balls without electrode volume fluctuations or with sufficiently small electrode volume fluctuations.

Several properties of such paper ball-like ultrafine particles of reduced graphene oxide (r-GO) make them advantageous for constructing the scaffold for the Li metal anodes. Firstly, these submicron-sized, paper ball-like graphene particles are resistant to aggregation or deformation even under stress, can be solution-processed in arbitrary solvents, and can readily assemble to form continuous graphene solid with scalable overall surface area. While graphene foams or films may break or collapse during Li cycling, the crumpled graphene balls are highly resistant to mechanical stress. Therefore, such scaffold is more tolerant to dynamic volume changes of Li metal. Moreover, the crumpled graphene balls are lithiophilic, thereby eliminating the need for additional lithiophilic coating or Li grow seeds that are typically needed for other carbon materials. Furthermore, the paper ball-like structure also has high external/internal surface area, which can help to dissipate the electrical current, allowing stable Li deposition/dissolution at both inside and in between the particles without any electrode volume fluctuations, or with sufficiently small electrode volume fluctuations, compared with that of a conventional Li metal anode. For example, in certain embodiments, the electrode volume fluctuations of the crumpled graphene balls coated anode electrodes with scalable Li loading up to about 10 mAh $cm^{-2}$ or more are sufficiently small with a tolerable range, e.g., less than 20%. Furthermore, Li ions are operably reversibly deposited or dissolved within the scaffold. The embodiments of the invention demonstrate that the crumpled graphene balls are indeed a promising building block for constructing light weight scaffolds to stabilize Li against dendrite growth. Significantly improved plating/stripping cycling performance of Li metal anodes is achieved.

In certain embodiments, a conducting, lightweight and lithiophilic scaffold is employed to stabilize high loading of Li during cycling of Li metal anodes and avoid its dendritic filament growth, so as to solve the problem of dendritic growth that leads to unstable solid electrolyte interphase (SEI), volume fluctuation during cycling and even shorting of the battery.

In certain embodiments, crumpled paper ball-like graphene particles are assembled to yield the conducting, lightweight and lithiophilic scaffold with scalable Li loading up to about 10 mAh $cm^{-2}$ within tolerable volume fluctuation. In certain embodiments, high Coulombic efficiency of about 97.5% over about 750 cycles (about 1500 hours) is achieved. Plating/stripping Li up to about 12 mAh $cm^{-2}$ on the crumpled graphene balls scaffold does not experience dendrite growth.

Another aspect of the present invention relates to a method for forming crumpled graphene balls. In one embodiment, the method includes nebulizing a graphene oxide aqueous dispersion into aerosol droplets; and forming crumpled graphene balls by solvent evaporation induced isotropic compression.

In one embodiment, the method further includes a heat treatment of the formed crumpled graphene balls.

The rumpled graphene balls can be assembled to yield a scaffold for a Li metal electrode, i.e., Li metal anode. The scaffold has volumes and voids inside and in between the crumpled graphene balls, which allow uniform and stable Li deposition/dissolution inside and in between the crumpled graphene balls without electrode volume fluctuations or with sufficiently small electrode volume fluctuations. The scaffold is a conducting, lightweight and lithiophilic scaffold.

A further aspect of the present invention relates to an energy storage device. The energy storage device includes a Li metal electrode as disclosed above.

In one embodiment, the energy storage device has a performance with scalable Li loading up to about 10 mAh $cm^{-2}$ for the Li metal electrode with a thickness of about 120 μm within tolerable volume fluctuation.

In one embodiment, the energy storage device has a performance with a stable Coulombic efficiency of about 97.5% over about 750 cycles.

In one embodiment, the energy storage device has a performance with plating/stripping Li up to about 12 mAh $cm^{-2}$ on the Li metal electrode with a thickness of about 40 μm without dendrite growth.

In one embodiment, the energy storage device is a battery.

These and other aspects of the present invention are further described below.

Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Synthesis of Crumpled Graphene Balls (CGB) and their Assembly into Electrodes

In certain embodiments, the crumpled graphene balls are prepared by an aerosol assisted capillary compression approach. Briefly, graphene oxide (GO) aqueous dispersion is first nebulized into aerosol droplets, followed by solvent evaporation induced isotropic compression. Heat treatment during or after crumpling can partially remove the oxygen-containing functional groups to yield reduce graphene oxide (r-GO).

In an exemplary embodiment, GO is prepared by a modified Hummer's method. About 2 mg/ml GO dispersion in water are nebulized by an ultrasonic atomizer to form aerosol droplets, which are carried by $N_2$ gas at about 1 L/min to fly through a horizontal tube furnace (tube diameter=about 1 in.) preheated at about 400° C. A Teflon filter is placed at the exhaust to collect the crumpled graphene particles. Then the collected sample of the crumpled graphene particles is placed in a tube furnace and heated under Ar at about 800° C. for about 1 h (ramping rate of about 5° C./min).

Figure 2:
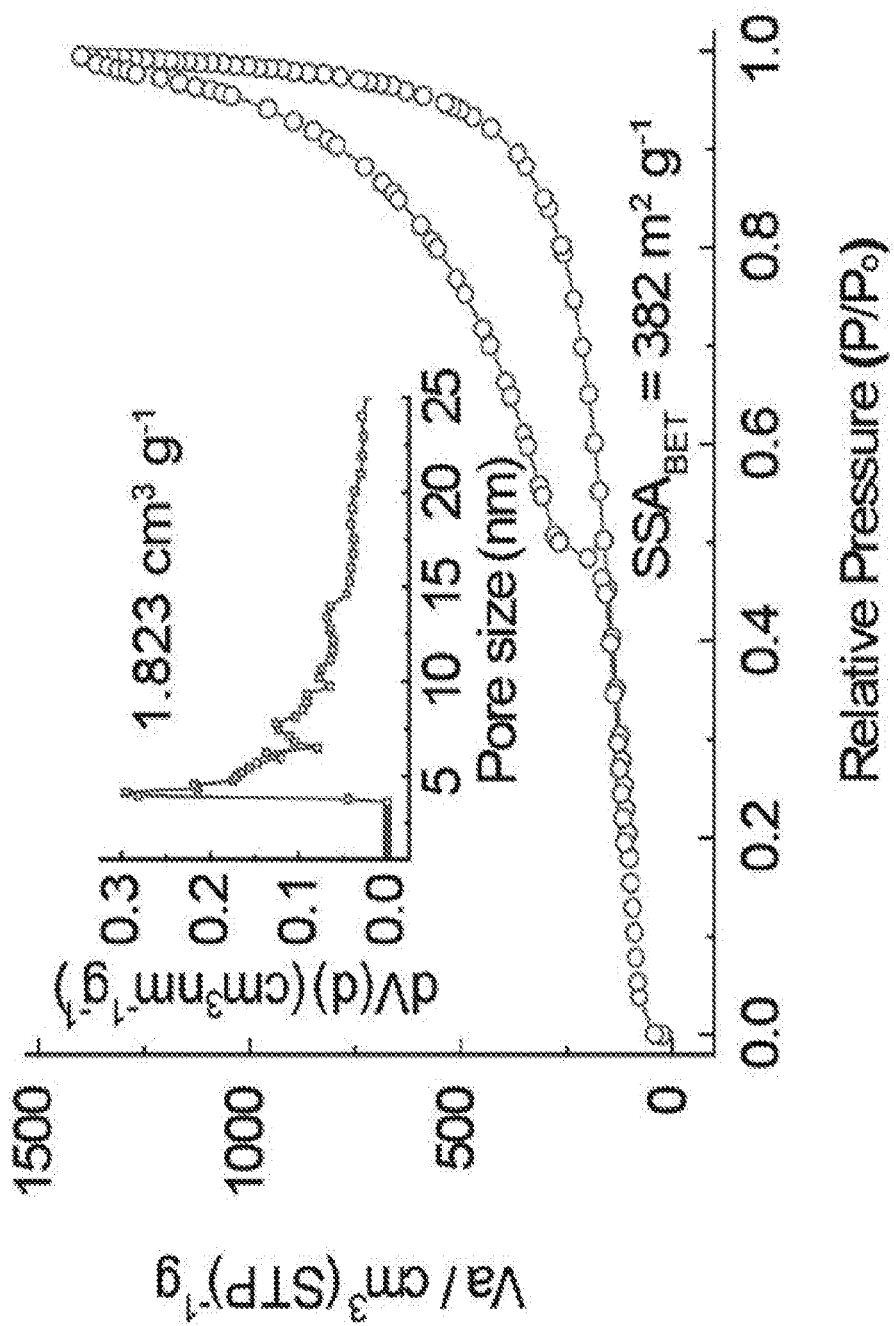
FIG. 2 shows $N_2$ adsorption-desorption isotherms and pore-size distribution of the crumpled graphene balls, according to one embodiment of the invention. The crumpled graphene balls have a high specific surface area of 382 $m^2 g^{-1}$ and a high pore volume of 1.8 $cm^3 g^{-1}$ dominated by mesopores and macropores.
Figure 6:
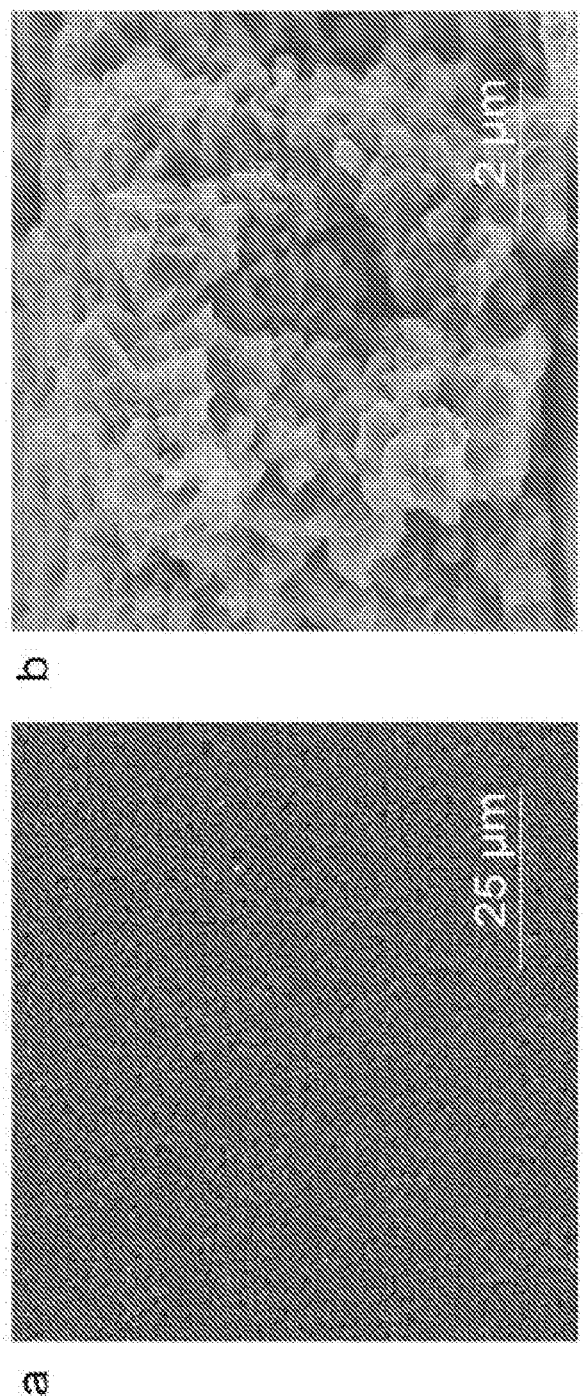
FIG. 6 shows (a) top-view and (b) cross-section SEM images of the crumpled graphene balls electrode, according to one embodiment of the invention.

The resultant crumpled graphene balls are aggregation resistant, and their morphology is highly stable even under compression, as shown in panels (a) and (b) of FIG. 1. In the exemplary embodiment, the density of the compressed crumpled graphene balls powder is around about 0.55 g cm$^{-3}$, indicating that the sub-micron crumpled balls have abundant free volume and voids inside and in between the balls, which are also at sub-micron scale. N$_2$ adsorption-desorption isotherms confirm that the crumpled graphene balls have a specific surface area of about 382 m$^2$ g$^{-1}$ with a pore volume of about 1.8 cm$^3$ g$^{-1}$, as shown in FIG. 2. It should be noted that the surface or pore volume are dominated by mesopores and macropores, which are more effective than micropores as nucleation sites to dissipate the effective current density for Li nucleation and deposition. An interesting phenomenon is the crumpled graphene balls can close pack into a continuous solid with a highly uniform top surface with a single particle level of smoothness, resembling the appearance of colloidal crystals, when they are solution-cast onto a surface such as a Cu current collector, as shown in FIG. 6. The low roughness of the electrode top surface is beneficial for uniform Li deposition, because protruding surface features tend to promote Li dendrite growth. As disclosed below, cross sectional scanning electron microscope (SEM) images also show that the crumpled graphene balls do not form particle clusters and the voids are quite evenly distributed.

Due to the aggregation resistant property, when the crumpled graphene balls are mixed with binder and fabricated into electrodes coated on a Cu foil, they have a mono-particles layer like flat top surface, which is rare for carbon nanostructures.

In one embodiment, the as-obtained crumpled graphene balls (CGB) and polyvinylidene fluoride (PVDF) binder with a mass ratio of CGB:PVDF about 9:1 are mixed into a slurry by magnetic stirring in N-methylpyrrolidone for about 24 h. Then the slurry is coated onto a Cu foil and dried in a vacuum drying oven at about 60° C. for about 6 h. The foil is punched into disks with a diameter of about 13 mm as the working electrode. In one embodiment, the crumpled graphene balls electrodes are assembled in 2032-type coin cells with Li metal as the reference and counter electrode. In one embodiments, the electrolyte is 1 M lithium bis(trifluoromethane)sulfonamide (LiTFSI) in 1,3-dioxolane/1,2-dimethoxyethane (DOL/DME, about 1:1 by volume, 30 al, Sigma Aldrich) with about 1 wt % LiNO$_3$ additives. Pretreatment of the working electrode is achieved by cycling the battery between 0 and 2 V for 10 cycles. The electrode is then tested by depositing and dissolving a controlled amount of Li at different current densities.

In-Situ TEM Observations of Lithiation/Delithiation of Crumpled Graphene Galls

To visualize the Li deposition process in the crumpled graphene balls, in-situ transmission electrode microscopy (TEM) is employed to directly observe the Li deposition process on the crumpled graphene balls.

Figure 3:
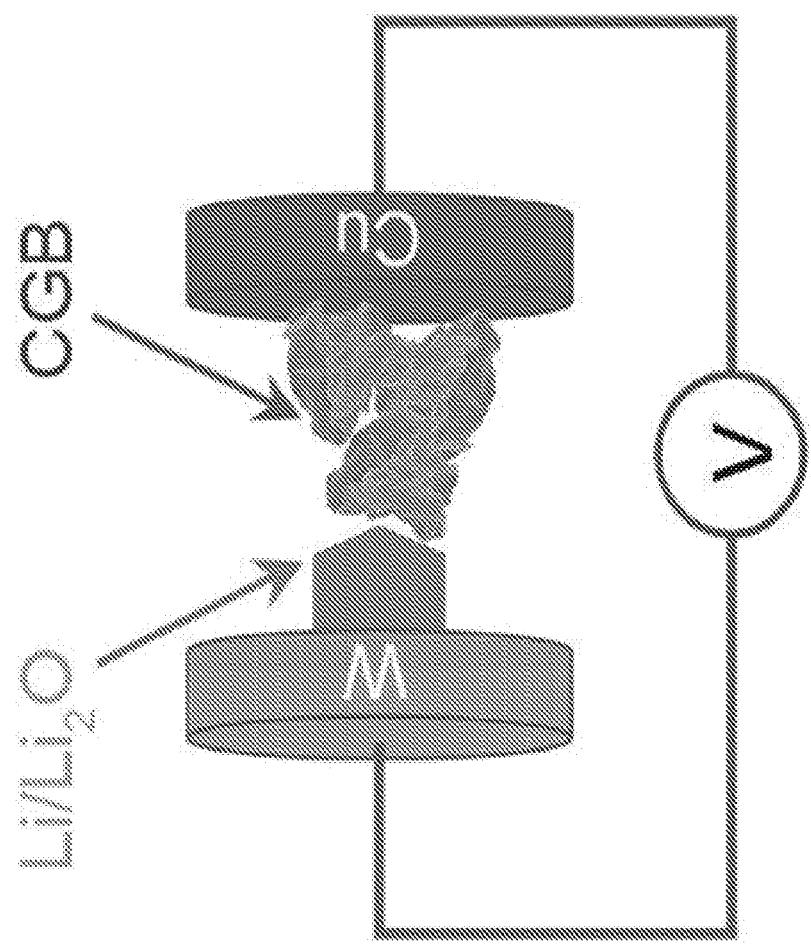
FIG. 3 shows schematically an in-situ TEM cell according to one embodiment of the invention.
Figure 4:
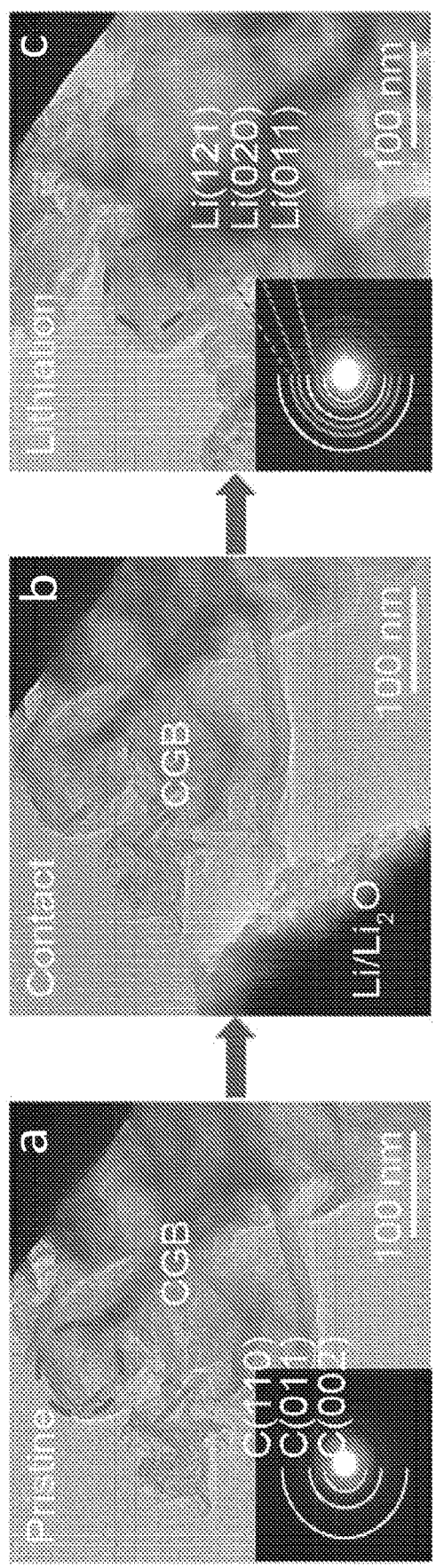
FIG. 4 shows TEM images taken during the lithiation process in the crumpled graphene balls according to one embodiment of the invention, where panel (a) shows no Li signal the crumpled graphene balls before the experiment; panel (b) shows when the Li/$Li_2O$ is in contact with the crumpled graphene ball and a voltage bias is applied to inject Li ions into the crumpled graphene balls, the crumpled morphology became blurred and Li is deposited inside the crumpled graphene balls; and panel (c) shows that Li deposition takes place around the crumpled graphene balls particles, but no dendritic Li growth is observed.
Figure 5:
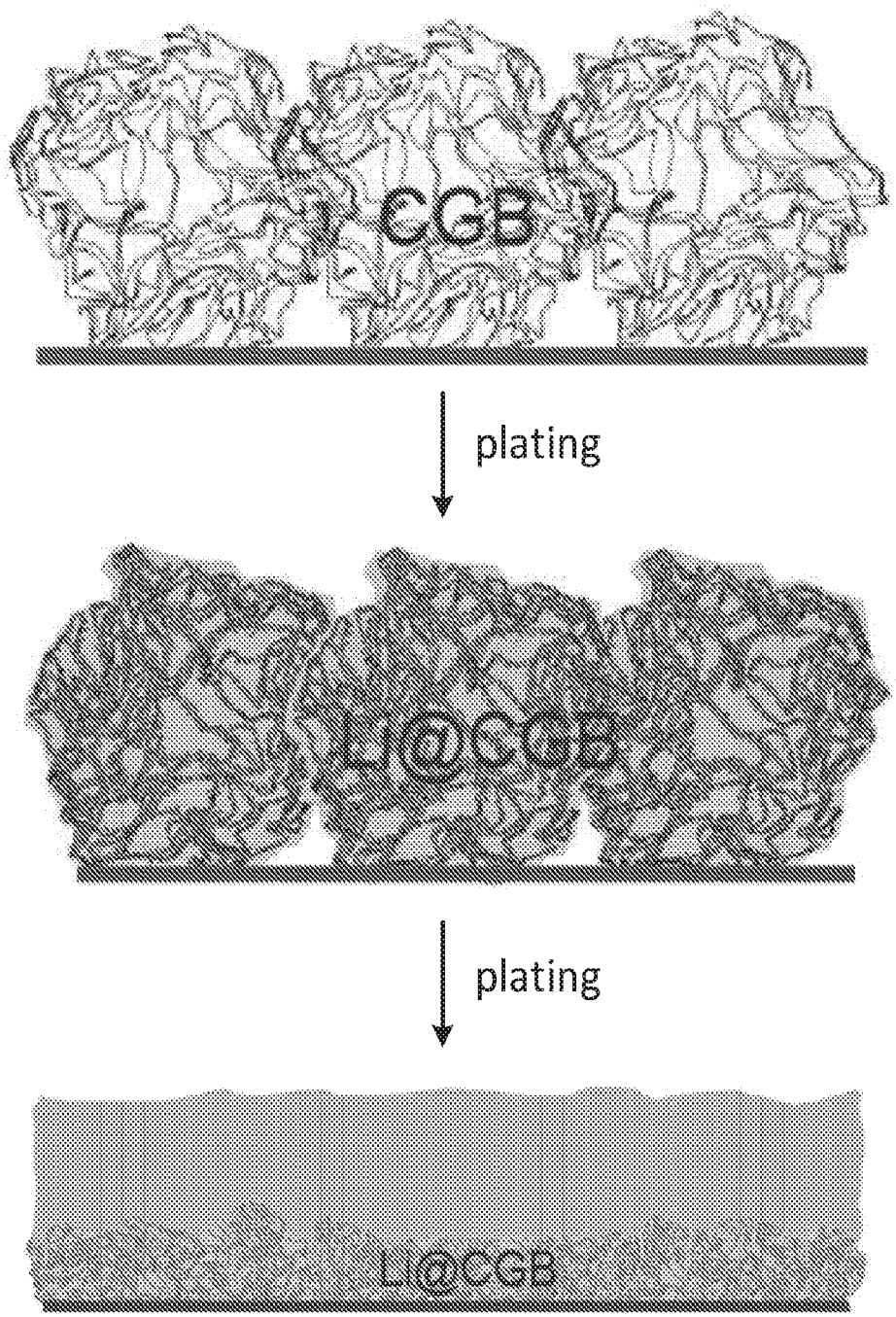
FIG. 5 shows schematically the crumpled graphene balls supporting high loading of Li metal without experiencing high volume fluctuation, according to one embodiment of the invention, where Li deposition on the top of the CGB electrode does not experience dendrite growth. S. William, J. Hummers, R. E. Offeman, J. Am. Chem. Soc. 1958, 80, 1339.

In one embodiment, a specialized dual-probe biasing TEM holder is used, in which a Cu rod is used as one electrode (a sample holder) and loaded with a small amount of crumpled graphene balls on its tip. The other electrode is a W (tungsten) probe decorated with a small piece of a Li metal. A layer of Li$_x$O is grown on the surface of the Li metal upon exposure to air for a few of seconds during the holder transferring, which acts as a solid electrolyte for the nanocell Li battery, as shown in FIG. 3. First, no Li signal is detected in the CGB according to electron diffraction patterns before the experiment, as shown in panel (a) of FIG. 4. When the Li/Li$_2$O is in contact with the crumpled graphene balls and a voltage bias is applied to inject Li ions into the crumpled graphene balls, the crumpled morphology became blurred and Li is deposited inside the crumpled graphene balls confirmed by electron diffraction patterns, as shown in panel (b) of FIG. 4. Further, Li deposition takes place around the crumpled graphene ball particles, but no dendritic Li growth is observed, as shown in panel (c) of FIG. 4. Also as shown in FIG. 5, the crumpled graphene balls support high loading of Li metal without experiencing high volume fluctuation. Li deposition on the top of the CGB electrode does not experience dendrite growth. When a reverse voltage bias is applied, Li is stripped out and the CGB became clear and crumpled morphology became more spherical.

Microstructure of Crumpled Graphene Balls Stabilized Li Metal Anodes

In one embodiment, an SEM (Hitachi S4800, Japan) operated at about 5.0 kV and a TEM (JEOL, Japan) operated at about 200 kV are employed to characterize the morphology of Li deposition on the crumpled graphene balls anode and Cu foil anode. To observe the morphology of deposited Li on the crumpled graphene balls and Cu foil, batteries are firstly disassembled in Ar-filled glove box to get the Li anode. The metal sample is protected with Ar during transfer process. Nitrogen adsorption/desorption isotherms are obtained using a Belsorp-Mini instrument (BEL, Japan). The pore size distributions are calculated using the density functional theory method from the adsorption branches of the isotherms.

Figure 7:
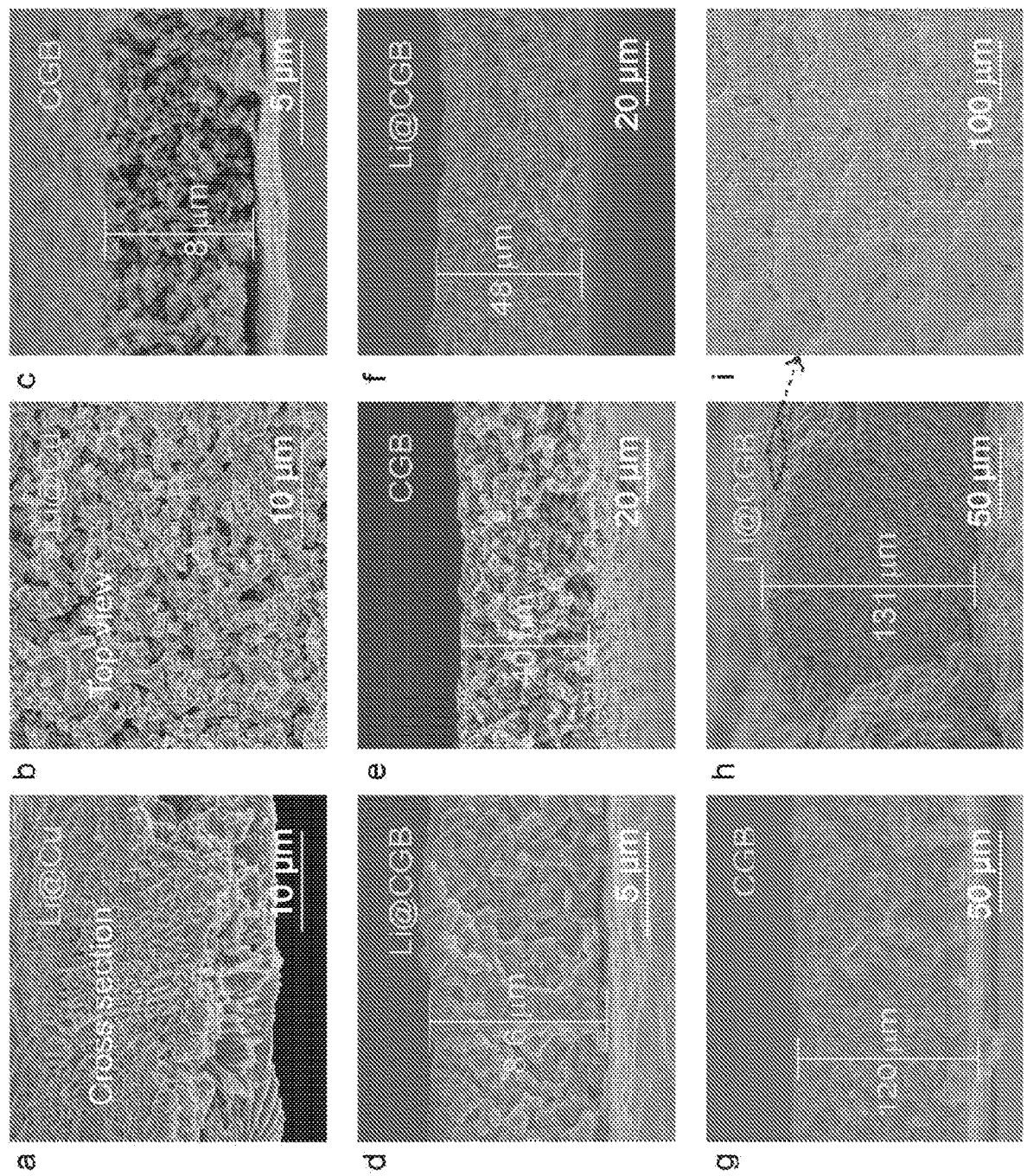
FIG. 7 shows scalable Li loading in the crumpled graphene balls without experiencing high volume fluctuation, according to embodiments of the invention. Panels (a) and (b) are cross-section and top-view SEM images of mossy dendrites grown on a planar Cu substrate after depositing 0.75 mAh cm$^{-2}$ of Li. Panels (c) and (d) are respectively cross-section SEM images of 8 μm thick CGB coated Cu before and after depositing 0.75 mAh cm$^{-2}$ of Li. Panels (e) and (f) are respectively cross-section SEM images of 40 μm thick CGB coated Cu before and after depositing 3.75 mAh cm$^{-2}$ of Li. Panels (g) and (h) are respectively cross-section SEM images of 120 μm thick CGB coated Cu before and after depositing 10 mAh cm$^{-2}$ of Li. Panel (i) is a top-view SEM image of 120 μm thick CGB coated Cu and after depositing 10 mAh cm$^{-2}$ of Li.
Figure 8:
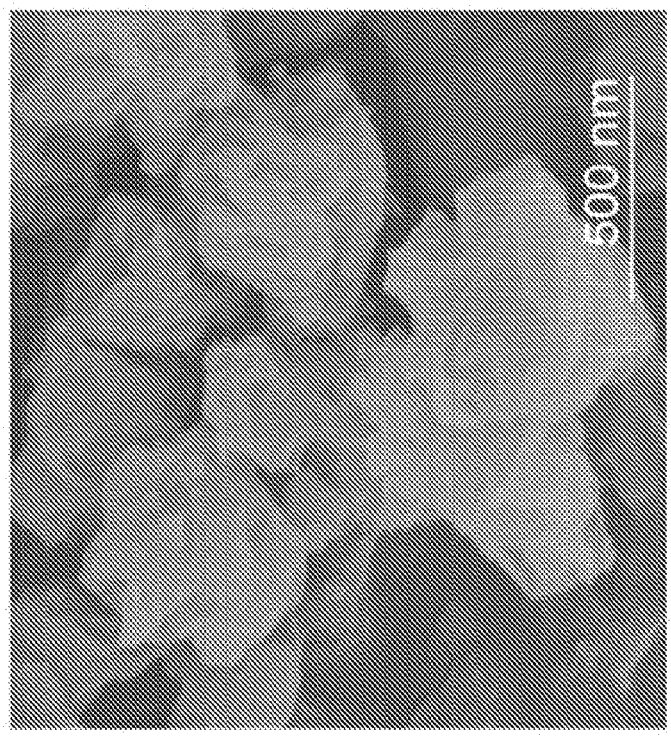
FIG. 8 shows SEM images of crumpled graphene balls from 8 μm thick CGB electrode after depositing 0.75 mAh cm$^{-2}$ (a) and 1 mAh cm$^{-2}$ (b) of Li, according to embodiments of the invention.
Figure 8:
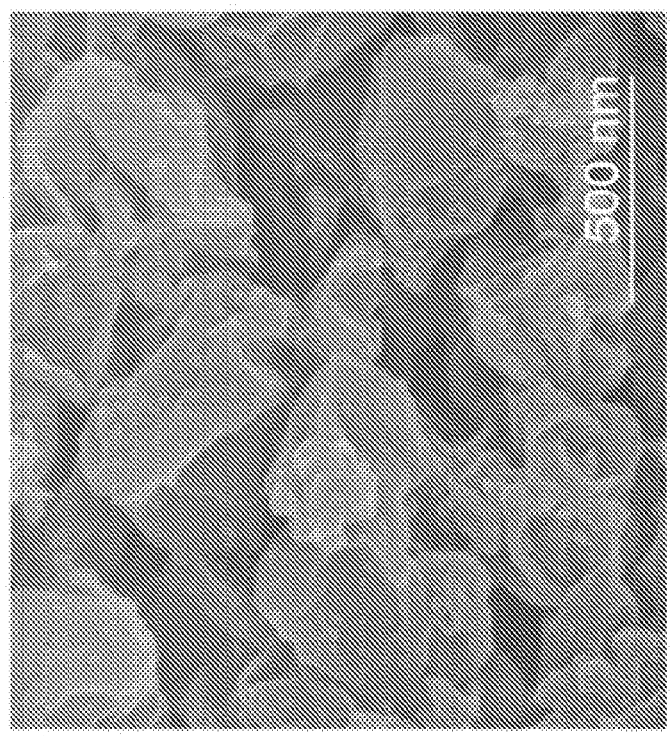
Figure 9:
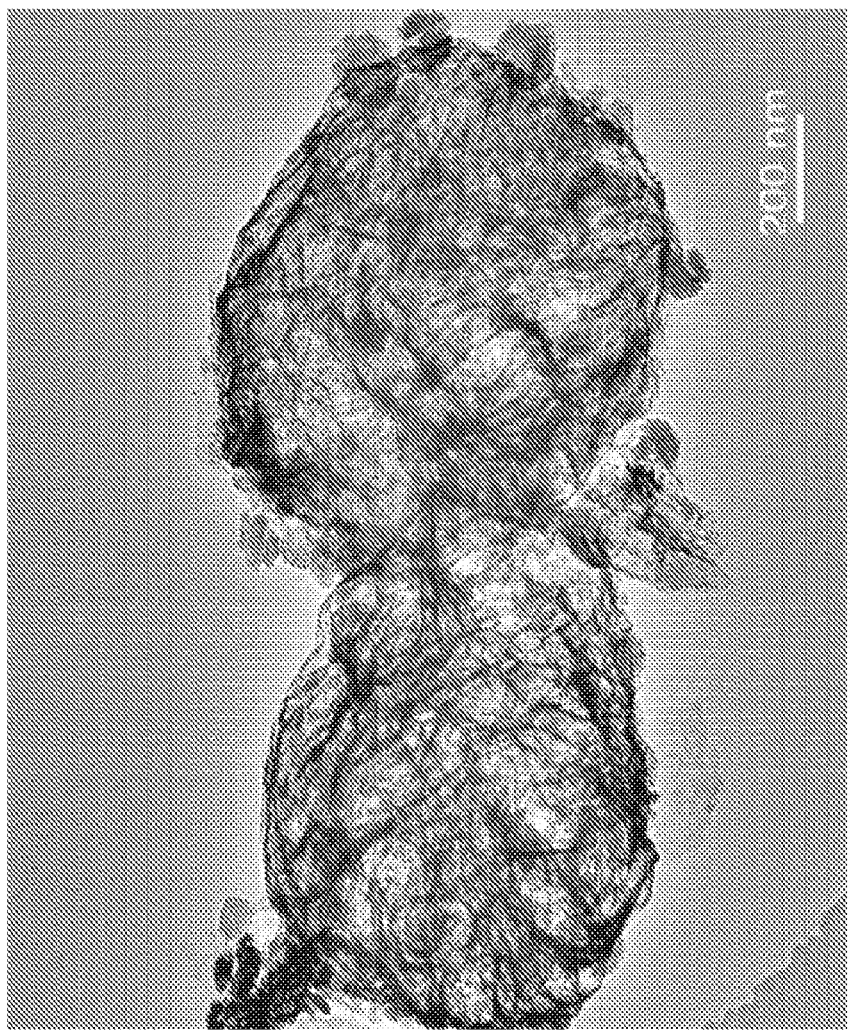
FIG. 9 shows a TEM image of crumpled graphene balls after depositing 1 mAh cm$^{-2}$ of Li metal for 20 cycles, according to embodiments of the invention. The image is acquired after washing the Li with DMSO and Ethanol.

The Li deposition/dissolution behaviors of the crumpled graphene balls coated Cu electrodes with different mass loading (thickness) are studied in a coin cell configuration with a Li metal foil as a counter electrode, in comparison to bare Cu. As expected, massive arrays of Li dendrites can be clearly observed on the Cu foil after cycling, as shown in panels (a) and (b) of FIG. 7. In contrast, the thickness of the crumpled graphene balls electrodes with mass loading of about 0.55 mg cm$^{-2}$ increases from about 8 μm to about 8.6 μm after about 0.75 mAh cm$^{-2}$ of Li deposition without any dendrite observed, as shown in panels (c) and (d) of FIG. 7. This thickness increase is comparable to the d-space increase of graphite after Li intercalation (from about 0.335 nm to about 0.371 nm), and thus is tolerable at an electrode level. The specific Li storage capacity of the crumpled graphene balls calculated is about 1344 mAh g$^{-1}$, higher than the specific capacity of graphitized carbon fibers electrodes for a Li anode. The Li deposition amount in the crumpled graphene balls is scalable with electrode thickness within tolerable thickness increase. For instance, depositing about 3.75 mAh cm$^{-2}$ and about 10 mAh cm$^{-2}$ of Li in about 40 μm and about 120 μm thick crumpled graphene ball electrode increases the electrode thickness to about 48 μm and about 131 μm, respectively, as shown in panels (e)-(h) of FIG. 7, but without dendrite growth, as shown in panel (i) of FIG. 7. Close examination of the crumpled graphene balls particles after removing the loaded Li reveals that their crumpled morphology remains largely unchanged, as shown in FIG. 8. The top surface morphology of crumpled graphene balls coated Cu electrodes is also characterized at different stage of Li deposition/dissolution, as shown in FIG. 9. No mossy dendritic filaments are observed.

Figure 10:
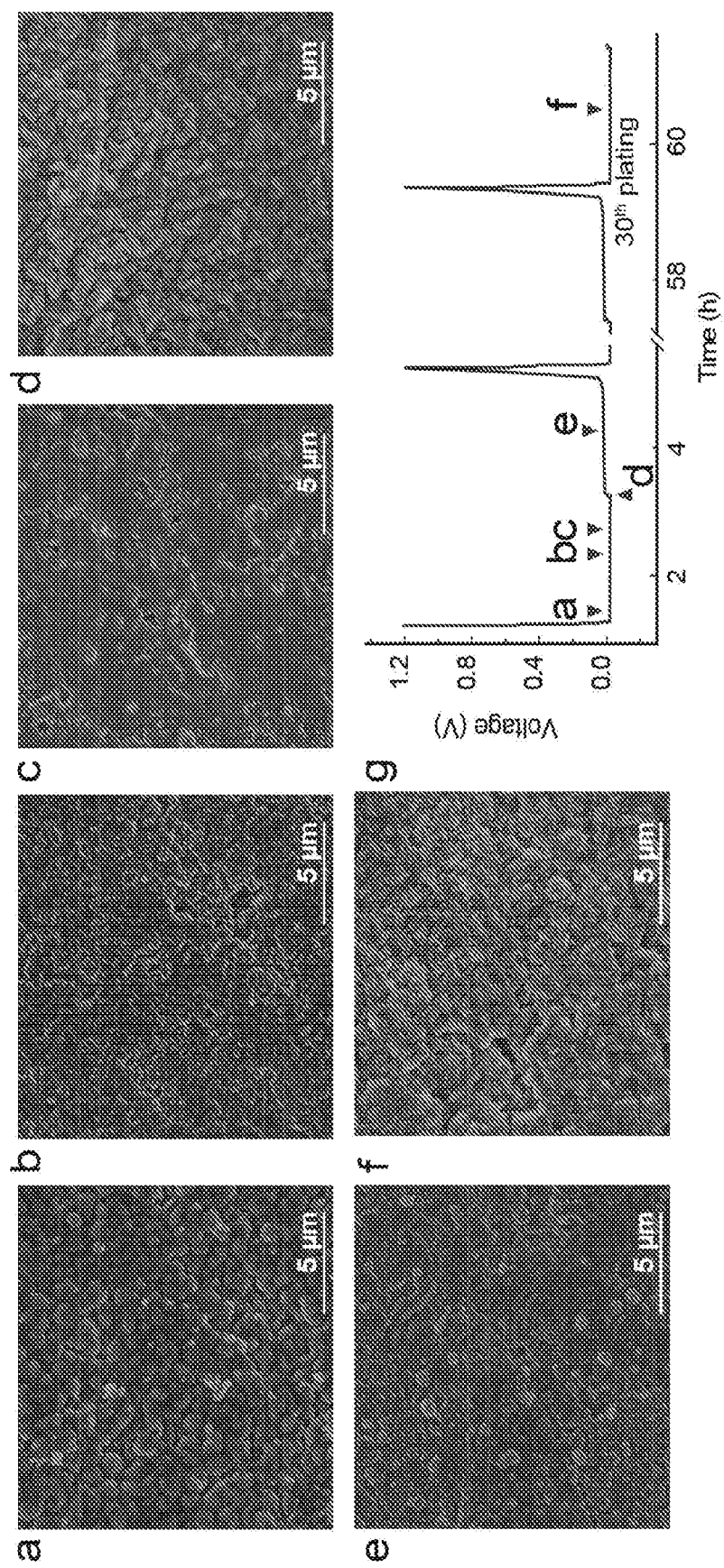
FIG. 10 shows top-view SEM images of 8 μm thick CGB electrode coated Cu after depositing (a) 0.1 mAh cm$^{-2}$, (b) 0.5 mAh cm$^{-2}$, (c) 0.75 mAh cm$^{-2}$, (d) 1 mAh cm$^{-2}$, and then dissolving (e) 0.5 mA cm$^{-2}$ of Li and (f) after 30 cycles. The Li deposition/dissolution states in panels (a)-(f) are indicated in panel (g) galvanostatic discharge/charge voltage profiles at a current density of 1 mA cm$^{-2}$.

If a larger amount of Li (e.g., 1 mAh cm$^{-2}$) is deposited into an 8 μm thick CGB electrode, the thickness of the electrode increases from about 8 μm to about 10.5 μm and the crumpled morphology of the crumpled graphene balls became more spherical, as shown in FIG. 8, which is consistent with the in-situ TEM observation. The low atomic number of Li makes it challenging to visualize the Li encapsulated crumpled graphene balls under ex-situ microscopy. But the morphology change indicates that the Li deposition starts from inside of the crumpled graphene balls. After the crumpled graphene balls are fully filled by Li, expansion of the crumpled graphene balls to more spherical morphology takes place to accommodate more Li. The more spherical morphology maintains after cycling, as shown in FIG. 9, which are beneficial for a stable SEI as the electrode thickness only increases for the first deposition cycle and no thickness fluctuation occurs for the later cycling. To have a better understanding of the amount of Li deposited, the areal capacity can be converted to mass capacity as the way in reactive hosts. The specific Li storage capacity of the crumpled graphene balls calculated is about 1344 mAh $g^{-1}$, which is four times the capacity of graphite. By volume, about 0.75 mAh $cm^{-2}$ of Li metal deposited corresponds to about 3.7 μm dense Li distributed in 8 μm thick CGB electrodes (the capacity and density of Li are 3860 mAh $g^{-1}$ and 0.53 g $cm^{-3}$). The top surface morphology of crumpled graphene balls coated Cu electrodes is also characterized after different amounts of Li deposition, as shown in panels (a)-(d) of FIG. 10. The void space between the crumpled graphene balls is gradually filled with Li deposition, forming a smooth surface. Lumps started to protrude out after 1 mAh $cm^{-2}$ of Li deposition, but not as significant as the bare Cu. After dissolving half of the Li deposited, relative flat surface with voids and a few round particles of the crumpled graphene balls sitting on top is observed, as shown in panel (e) of FIG. 10, which are likely caused by the lump protruding induced detachment of some weakly bonded crumpled graphene balls. Even after 30 cycles of overloaded 1 mAh $cm^{-2}$ deposition/dissolution, no mossy dendritic filaments are observed, as shown in panel (f) of FIG. 10. In short, the CGB electrodes have high Li storage capacity without dendrite formation or electrode thickness fluctuation. As a result, a stable SEI layer is maintained and high Coulombic efficiency is expected.

Figure 11:
FIG. 11 shows SEM images indicating dendrite free high amount of Li grown on the top of CGB electrodes, according to embodiments of the invention, where panel (a) is for 3 mAh cm$^{-2}$ Li deposited on 8 μm thick CGB electrode; panel (b) is for 6 mAh cm$^{-2}$ Li deposited on 40 μm thick CGB electrode; and panel (c) is for 12 mAh cm$^{-2}$ Li deposited on 40 μm thick CGB electrode.
Figure 11:
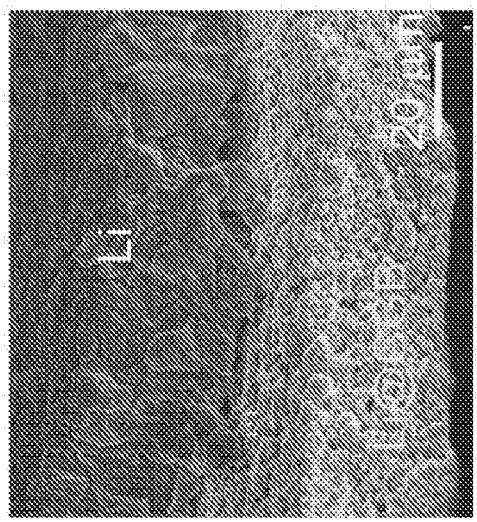
Figure 11:
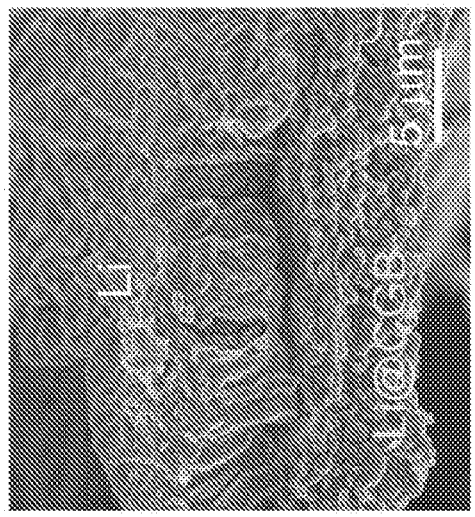

The crumpled graphene balls can readily assemble into a densely packed structure, with sub-micron scale free volumes evenly distributed both inside as well as in between the particles. Li first deposited inside the crumpled graphene balls and then grown outside the balls until the void space as gradually filled with Li deposition, forming a smooth surface. Even larger amount of Li deposited would grow on top of the crumpled graphene balls electrodes, as shown in FIG. 11. For example, when about 12 mAh $cm^{-2}$ of Li is deposited on the 40 μm thick crumpled graphene balls electrodes, the thickness of the electrode increased with around 100 μm deposited Li grown on the top. But the surface remained smooth without dendrites.

Electrochemical Performance

For the full cell test, in one embodiment, $LiFePO_4$ is employed as a cathode material to assemble with the CGB anode. For preparing the $LiFePO_4$ electrode, $LiFePO_4$, acetylene black and PVDF are mixed at a weight ratio of about 8:1:1 to form a homogeneous slurry, and then pasted on an Al foil. The foil is dried at about 60° C. under vacuum for about 6 h. The electrolyte is the same as that in half cells (1 M LiTFSI in DOL/DME, 30 μl). The CGB or bare Cu electrode is first assembled into a half cell using a Li foil as a counter electrode. After depositing about 1 mAh $cm^{-2}$ of Li metal, the cell is disassembled in an Ar-filled glove box and the as-obtained Li-CGB or Li—Cu anode is further reassembled into a full cell against $LiFePO_4$. The cells are galvanostatically cycled between about 2.4 and about 4.2 V at about 0.5 C.

For most high capacity Li ion battery anode materials such as Si, very long cycle life in half cell test can be obtained when they are well designed and engineered into composites. However, extracting even 500 mAh $g^{-1}$ is still challenging in full cell battery manufacturing, largely due to their insufficient Coulombic efficiency. For anodes, the Coulombic efficiency is defined as the ratio of the amount of Li stripped from to that plated during each cycle. In Si anodes based full cell, the Li comes from the Li-containing cathodes. Any imperfect Coulombic efficiency of anodes would lead to loss of Li, which depletes the cathodes and electrolyte and eventually result in short cycling life of the full cell.

To test the Coulombic efficiency, in one embodiment, a fixed amount of Li is deposited on the crumpled graphene balls/Cu electrode and then stripped away up to about 1.2 V at various current densities for each cycle. Electrochemical impedance spectroscopy (EIS) measurements are obtained over the frequency range of about 0.1 Hz to about 100 KHz with amplitude of about 5 mV using a CHI 660 electrochemical workstation.

Figure 12:
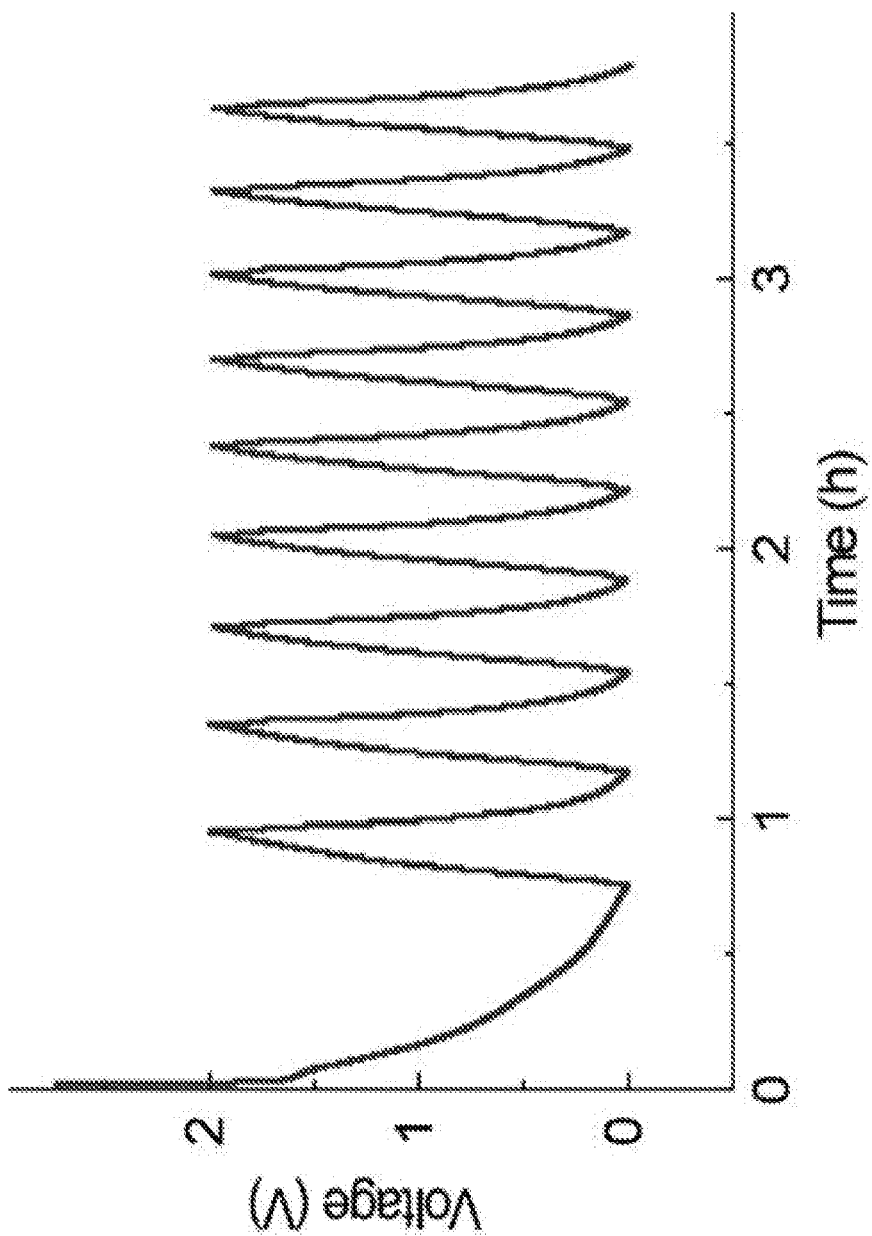
FIG. 12 shows a voltage profile during initialization process, according to one embodiment of the invention. The batteries are first cycled at 0-2 V (vs. Li$^+$/Li) at 0.5 mA cm$^{-2}$ for ten cycles for initialization prior to further electrochemical procedure. The Li storage capacity of the crumpled graphene balls electrode between 0-2 V is about 120 mAh g$^{-1}$ (without first cycle).
Figure 13:
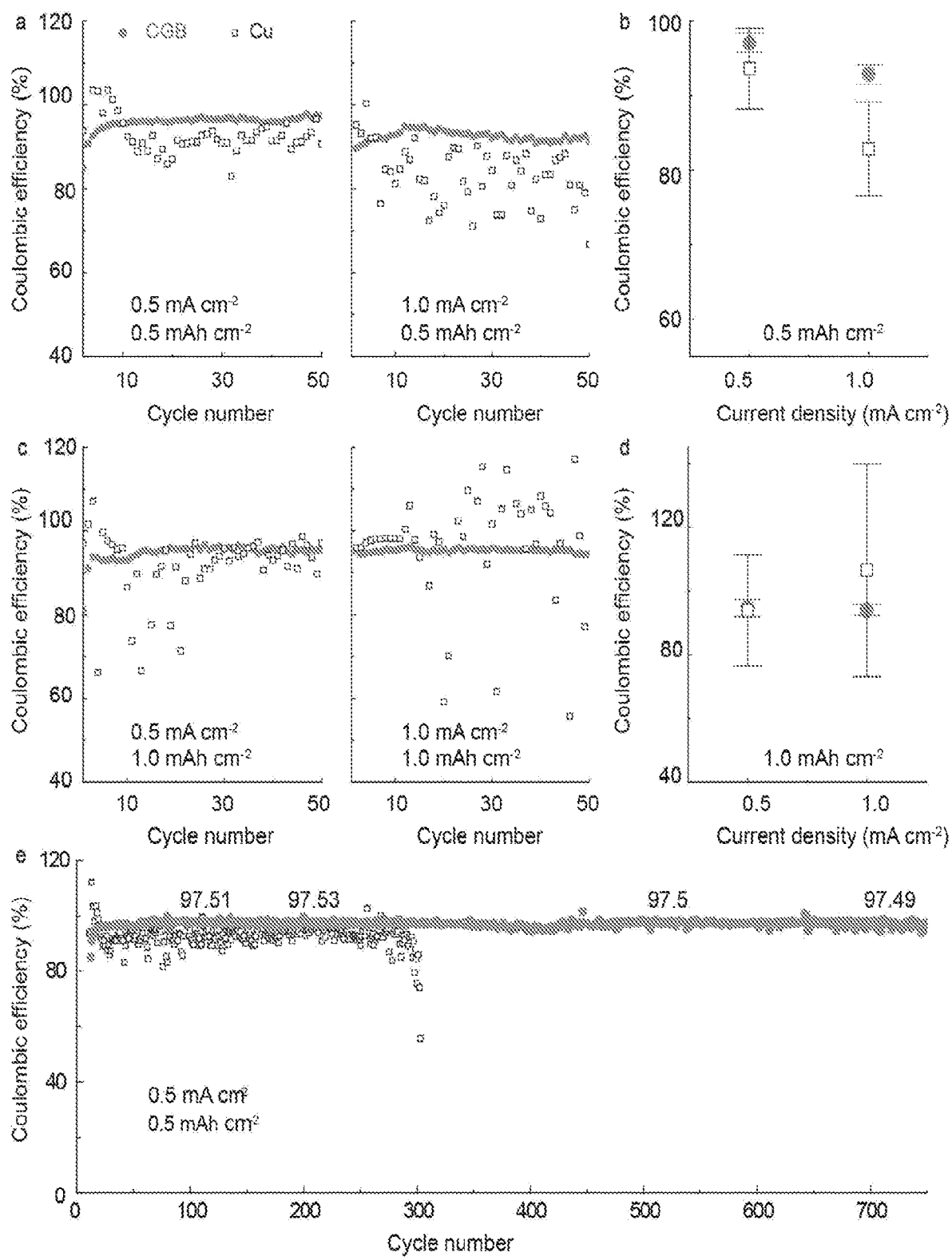
FIG. 13 shows electrochemical performance of the crumpled graphene balls electrodes (CGB) for Li metal anodes, according to embodiments of the invention. The first 50 cycling Columbic efficiency of the CGB electrodes and the controlled Cu electrodes with Li deposition amount of (a) 0.5 mAh cm$^{-2}$ and (c) 1 mAh cm$^{-2}$ in each cycle at different current rates. The corresponding average Columbic efficiency and its variance are presented in (b) and (d). (e) the Columbic efficiency of CGB electrodes and bare Cu electrodes with Li deposition amount of 0.5 mAh cm$^{-2}$ at a current rate of 0.5 mA cm$^{-2}$.

In one embodiment, the Coulombic efficiency of the CGB coated electrode is measured in a half-cell configuration with Li metal as the counter electrode and Li source. Cells with bare Cu electrodes are also assembled as reference. The batteries are first cycled between about 0 V and about 2 V for about 10 cycles to form a stable SEI on the electrodes, as shown in FIG. 12, followed by plating/stripping different amounts of Li at different current densities. With about 0.5 mAh $cm^{-2}$ of Li plated and then stripped away up to about 1.2 V for each cycle, the average Coulombic efficiency of the crumpled graphene balls coated electrodes is about 97.5% for the first 50 cycles at about 0.5 mA $cm^{-2}$ and about 94% at higher current density of about 1 mA cm 2, as shown in panel (a) of FIG. 13, which are significantly higher than the bare Cu electrodes (about 94.5% and about 83%, respectively). More importantly, the Coulombic efficiency of crumpled graphene balls electrodes is relatively stable while there is much larger fluctuation for bare Cu electrodes, especially at higher current density, as shown in panel (b) of FIG. 13. The lower Coulombic efficiency of the bare Cu electrodes reflects the unstable interface of Li on Cu and the large fluctuation indicates dendrite formation as the sporadic high Coulombic efficiency is presumed by reactivation of lost mossy Li in previous cycles. The difference in average Coulombic efficiency and their variance between the CGB and bare Cu electrodes became more pronounced when 1 mAh $cm^{-2}$ of Li is plated/stripped in each cycle, as shown in panels (c) and (d) of FIG. 13. The lower Coulombic efficiency of the bare Cu electrodes reflects the unstable SEI. And the large fluctuation can be attributed to the fracture of Li filament and dendrite, and the occasional reconnection of the fractured pieces from previous cycles. The higher and stable Coulombic efficiency of crumpled graphene balls electrode confirm that they allow Li to form stable interface, and much more uniform Li deposition. Indeed, as shown in panel (e) of FIG. 13, crumpled graphene balls electrode maintains high and stable Coulombic efficiency around 97.5% over 700 cycles, while the Coulombic efficiency of the bare Cu drops to below 60% after just 300 cycles.

Figure 14:
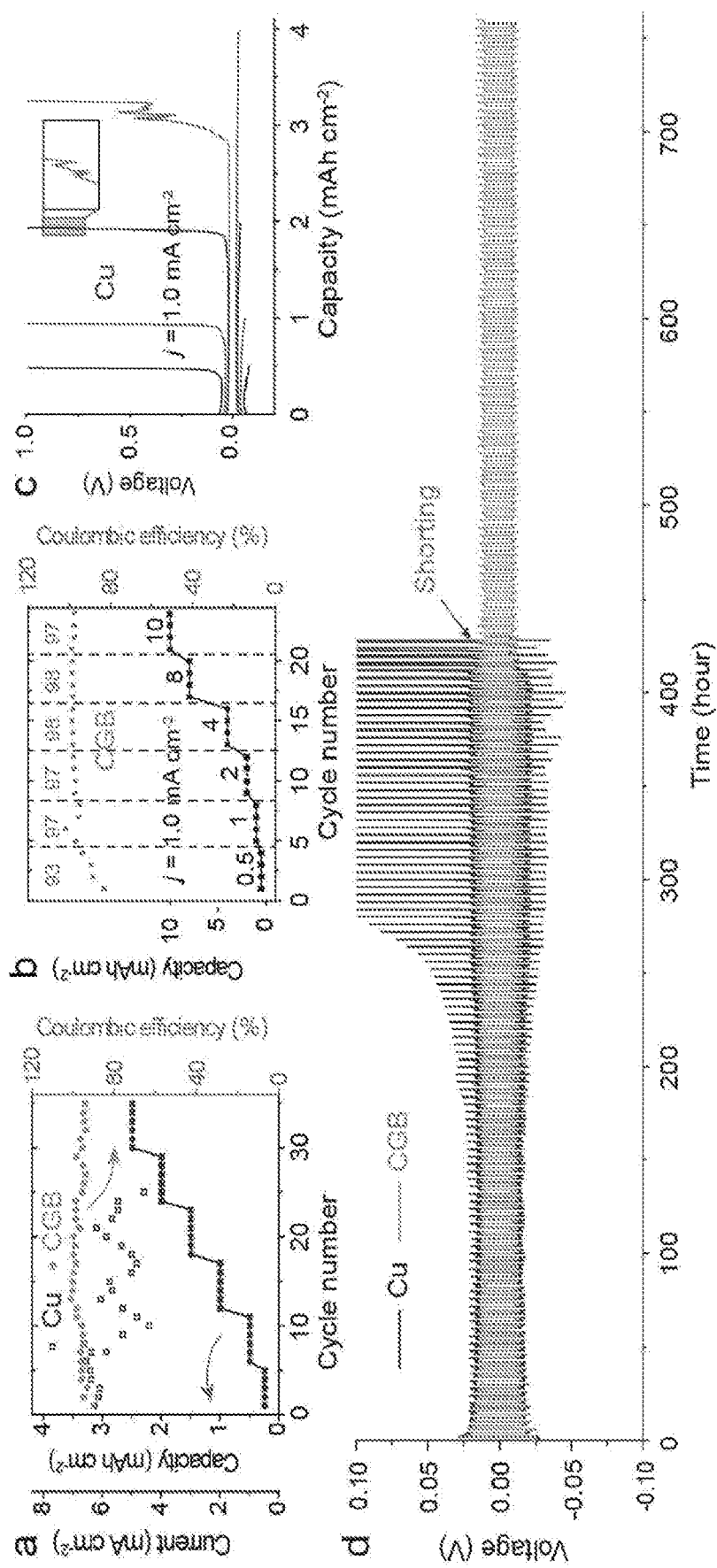
FIG. 14 shows electrochemical performance of the crumpled graphene balls (CGB) electrodes for Li metal anodes, according to embodiments of the invention. Panel (a) is the Coulombic efficiency of CGB and Cu electrodes with increasing current densities and capacities. Li is plated for 30 min at each cycle with a certain current density and then stripped away up to 1.0 V. Panel (b) is the Coulombic efficiency of the CGB electrode with increasing capacities. The current density is 1 mA cm$^{-2}$ and the stripping up voltage is 1 V. Panel (c) is plating-stripping curves of Cu electrode with increasing capacities. The current density is 1 mA cm$^{-2}$ and the stripping up voltage is 1 V. Panel (d) is galvanostatic cycling of symmetric Li@CGB and Li@Cu cells. The current density is fixed at 0.5 mA cm$^{-2}$ with each cycle set to 2 h.
Figure 15:
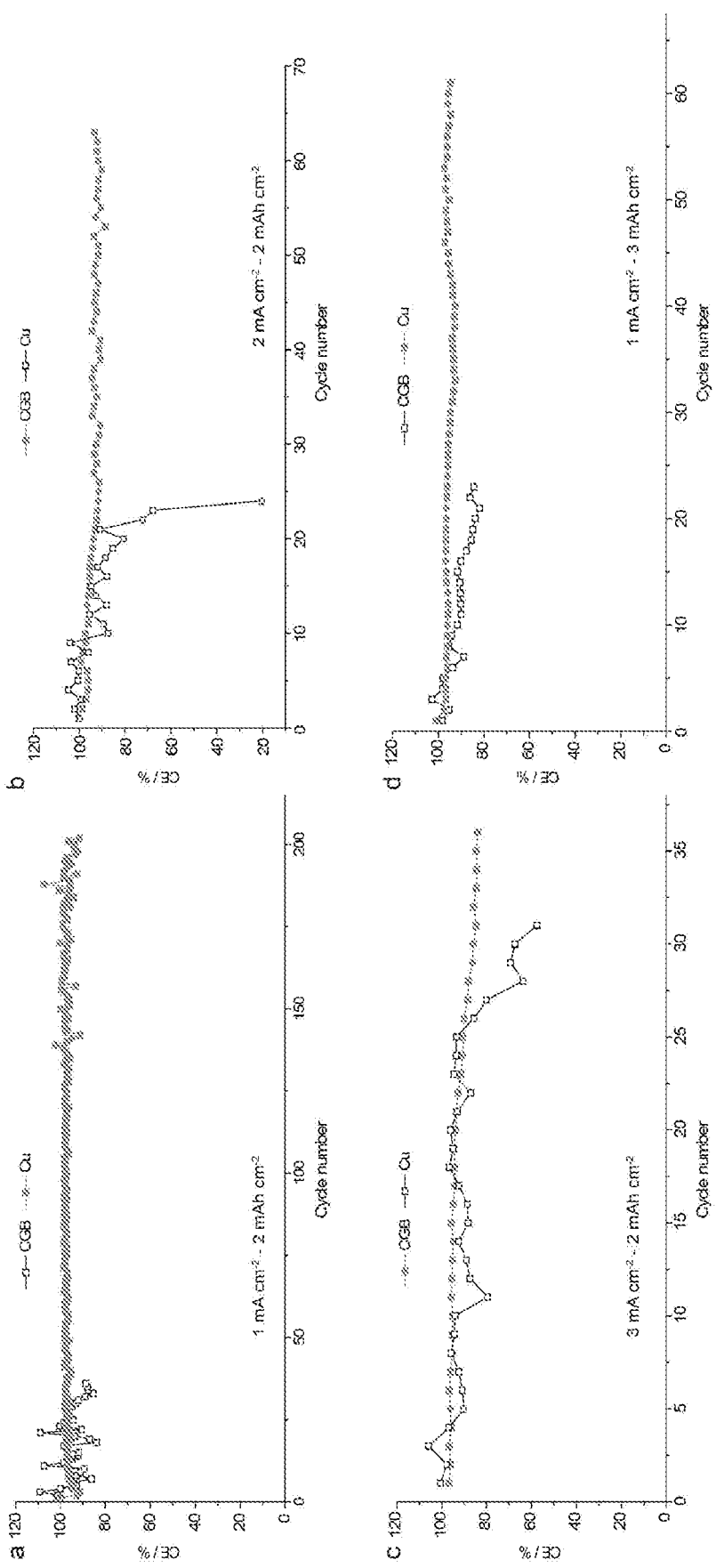
FIG. 15 shows the Columbic efficiency of the crumpled graphene balls electrodes and the controlled Cu electrodes with different Li deposited amount at different current densities, according to embodiments of the invention: (a) plating 2 mAh cm$^{-2}$ with a current density 1.0 mA cm$^{-2}$, (b) planting 2.0 mAh cm$^{-2}$ with a current density 2.0 mA cm$^{-2}$, (c) planting 2.0 mAh cm$^{-2}$ with a current density 3.0 mA cm$^{-2}$, and (d) planting 3.0 mAh cm$^{-2}$ with a current density 1.0 mA cm$^{-2}$.

At higher plating capacity and higher current density, the crumple graphene balls all outperform Cu electrodes, as shown in panels (a)-(e) of FIG. 14 and FIG. 15. The crumpled graphene balls maintain high Coulombic efficiency at current density over about 5 mA $cm^{-2}$ or Li deposition capacity as high as about 10 mAh $cm^{-2}$, as shown in panels (a) and (b) of FIG. 14, while the bare Cu electrode failed at current density over about 4 mA $cm^{-2}$ or capacity higher than about 3 mAh $cm^{-2}$, as shown in panels (a) and (c) of FIG. 14, and listed in Table 2.

Figure 16:
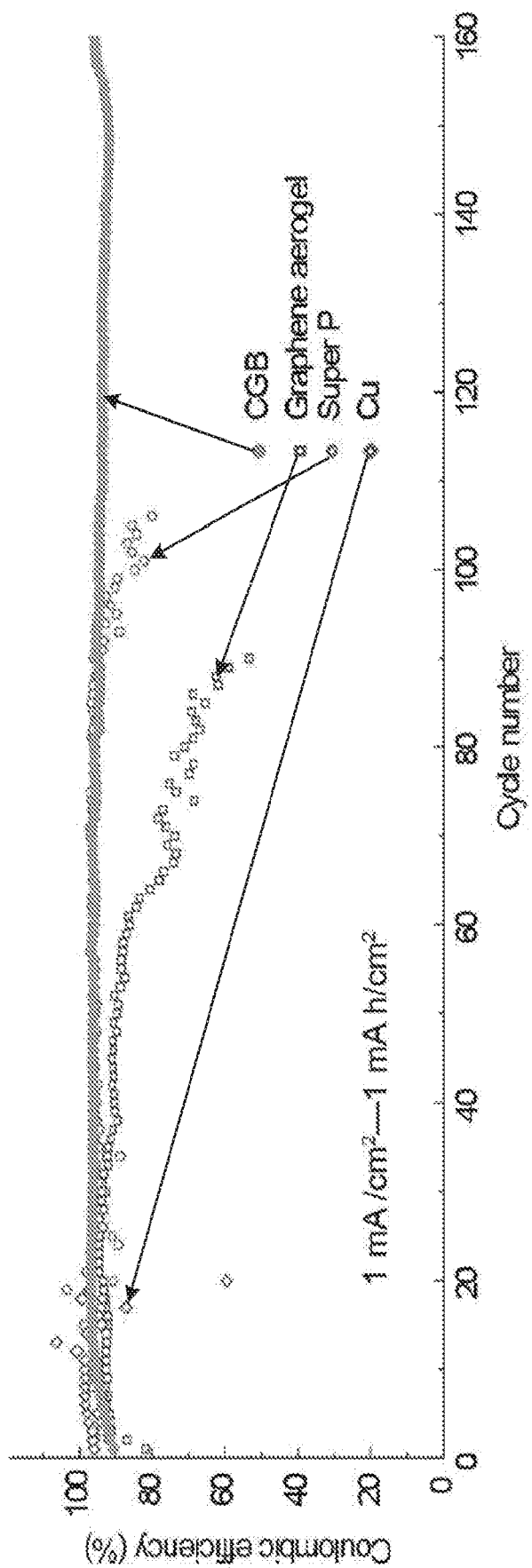
FIG. 16 shows the Columbic efficiency of different electrodes with Li deposited amount of 1 mAh cm$^{-2}$ at a current rate of 1 mA cm$^{-2}$.
Figure 17:
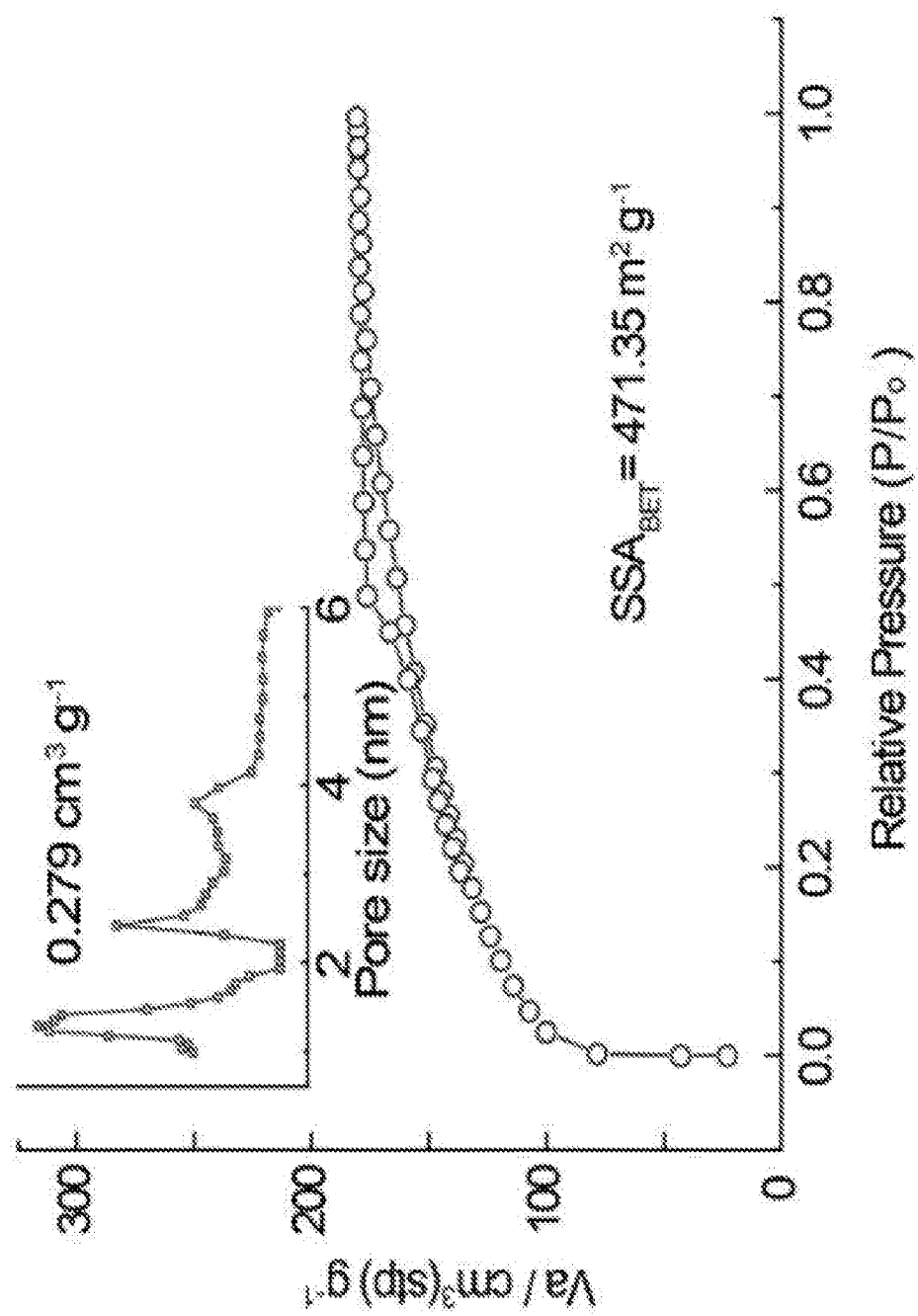
FIG. 17 shows N$_2$ adsorption-desorption isotherm of graphene aerogel and pore size distribution (inset).
Figure 18:
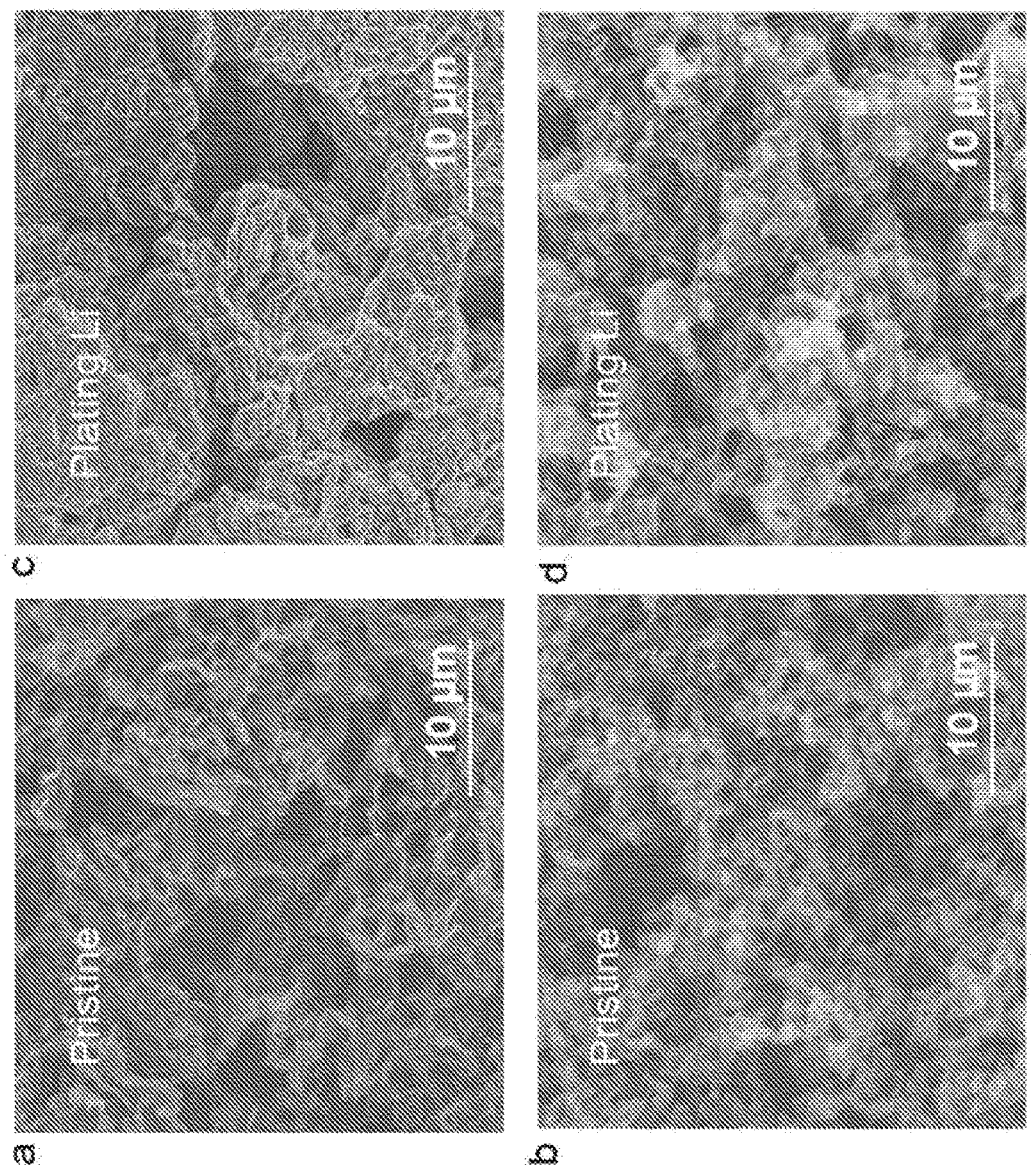
FIG. 18 shows SEM images of graphene aerogel (a) before and (c) after Li deposition, and super P (b) before and (d) after Li deposition.

In another set of control experiments, super P carbon black and graphene aerogel are studied, whose performances are better than bare Cu electrodes but still well below those of the crumpled graphene balls. The Coulombic efficiency decreased to below 80% after 110 cycles for Super P and 60 cycles for graphene aerogel, respectively, as shown in FIG. 16. Their relative worse performance compared to the crumpled graphene balls is likely own to their microstructure. The graphene aerogel is made up by chemically similar sheets to crumpled graphene balls, but structured in foam with discontinuous micropores, as shown in FIG. 17. In addition, the unevenly distributed voids in both Super P particle clusters and graphene aerogel also make it harder to achieve uniform Li deposition, as shown in FIG. 18, especially at thicker loading.

The Galvanostatic cycling stability of the Li@CGB electrode and Li@Cu electrode are compared by pre-loading about 2 mAh cm$^{-2}$ of Li. Symmetric cells are cycled with about 1 mAh cm$^{-2}$ Li plating/stripping for each cycle at current density of about 0.5 mA cm$^{-2}$. As shown in panel (d) of FIG. 14, the voltage hysteresis of the cell with Li deposited on Cu electrode gradually increased and the cell is shorted after 400 h. In the cell with Li loaded on crumpled graphene balls coated electrode, the voltage hysteresis is smaller and maintained unchanged for more than 750 h, indicating improved plating/stripping stability of the crumpled graphene balls.

Figure 19:
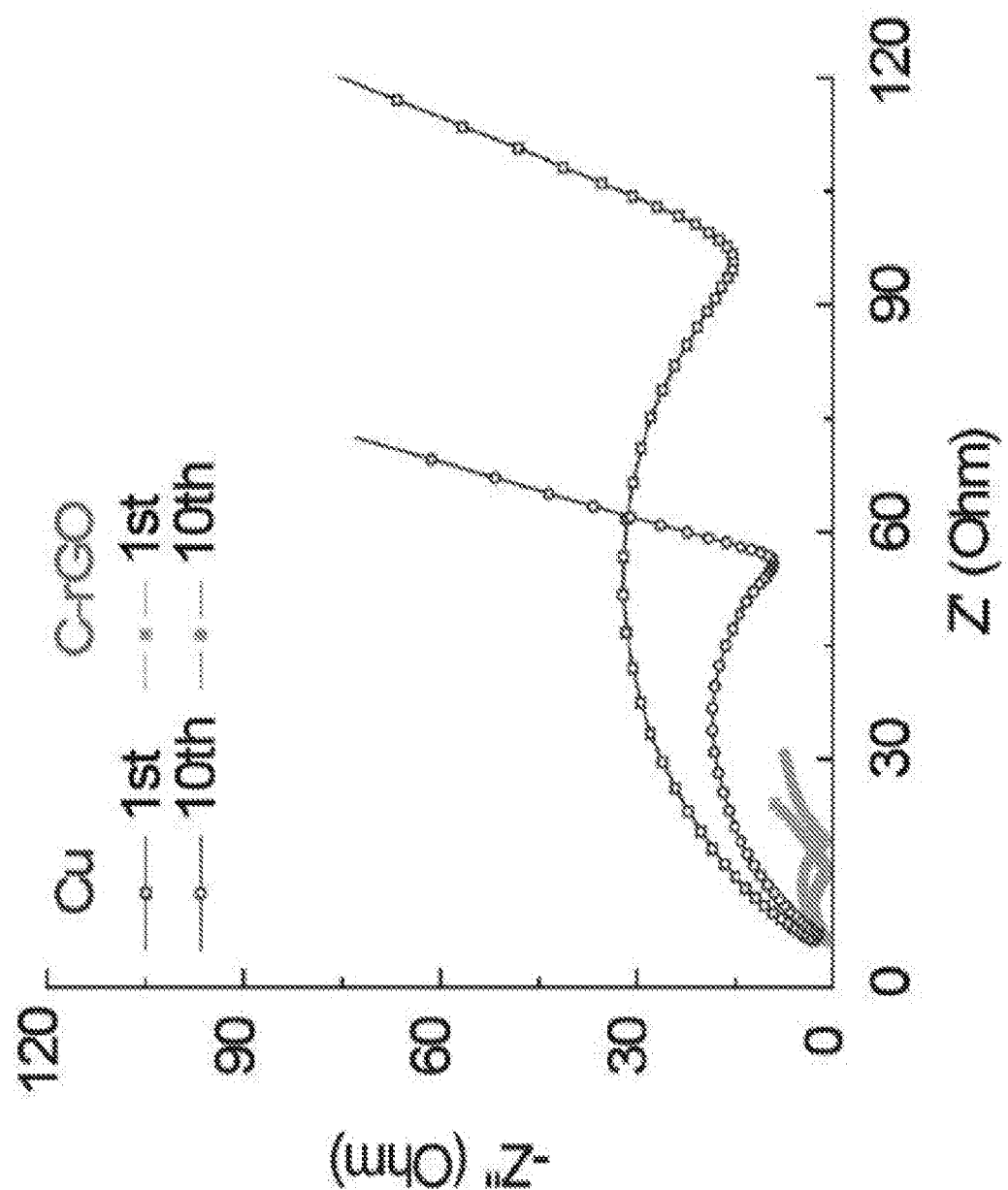
FIG. 19 shows EIS spectra of Li plated on crumpled graphene ball electrodes and the controlled planar Cu electrodes after 1$^{st}$ and 10$^{th}$ galvanostatic cycles.

Impedance spectroscopy measurement is conducted to understand Li plating/stripping process. After one plating/stripping cycle, the charge transfer impendence (denoted as the semicircle at high frequency in the Nyquist plots) is about 90Ω for the bare Cu, which is decreased to about 50Ω after ten cycles. While for the crumpled graphene balls coated electrode, the impedance is about 10Ω and about 14Ω after one and ten cycles, respectively, as shown in FIG. 19. The larger impedance for the bare Cu electrode suggests non-uniform Li deposition and the decreased impedance over cycling is an evidence for dendrite formation, which increases the interface area. The relative small impedance of crumpled graphene balls again suggests that Li can form stable interface and uniformly deposit on crumpled graphene balls.

TABLE 2

Scaffolds for Li metal anodes.

| Scaffold | Thickness (μm) | Thickness increase | Current (mA cm$^{-2}$) | Capacity (mAh cm$^{-2}$) | Coulombic efficiency (%) | Electrolyte | Reference |
|---|---|---|---|---|---|---|---|
| 3D Cu | 24 | 0 | 0.5-5 | 1-2 | 97 | 1M LiTFSI DME/DOL | Nat. Commun., 2015, 6, 8058 |
| De-alloyed Cu | 20 | 24-26 | 0.5-1 | 0.5-2 | ~97 | 1M LiTFSI DME/DOL, 1% LiNO$_3$ | Adv. Mater., 2016, 28, 6932 |
| 3D glass fiber cloth | Indidudual fiber: 10 μm | 0 | 0.5-10 | 0.5-2 | 91-98 | 1M LiTFSI DME/DOL, 2% LiNO$_3$ | Adv. Mater., 2016, 28, 2888 |
| Hollow carbon with Au NPs | 10 | 0 | 0.5 | 1-3 | 98 | 1M LiPF$_6$ EC/DEC | Nat. Energy, 2016, 1, 16010 |
| Graphene-CNT | 17.8 | 7.4 | 2.0 | 1-4 | 96.2-99.6 | 4M LiFSI in DME | ACS Nano, 2017, 11, 6362 |
| Unstacked graphene | 30 | — | 0.5-2 | 0.5-5 | 93 | 1M LiTFSI DME/DOL | Adv. Mater. 2016, 28, 2155 |
| N-doped graphene | 150 | 0 | 1-2 | 1-5 | 96-98 | 1M LiTFSI DME/DOL, 5% LiNO$_3$ | Angew. Chem., 2017, 56, 7764 |
| Carbon coated Ni foam | Ni pore size: 150 μm, Carbon: 3-4 mg cm$^{-2}$ | 0 | 0.5-4 | 1-8 | ~98 | 1M LiTFSI DME/DOL, 1% LiNO$_3$ | J. Am. Chem. Soc., 2017, 139, 5916 |
| Cu nanowire network | 52.4 | 0 | 1-5 | 7.5 | 97-98 | 1M LiTFSI DME/DOL, 1% LiNO$_3$, 5 uM Li$_2$S$_8$ | Nano Lett., 2016, 16, 4431 |
| Graphitized carbon fibers | 1000 | 0 | 0.5-1 | 8 | 98 | 1M LiTFSI DME/DOL, 1% LiNO$_3$ | Adv. Mater., 2017, 1700389 |
| Crumpled graphene balls | 8 | 0.6 | 0.5 | 0.75 | 97.5 | 1M LiTFSI DME/DOL, 1% LiNO$_3$ | This Invention |
| | 8 | 2 | 0.5-1 | 1 | 97.5 | | |
| | | 6 | 1 | 3 | 98 | | |
| | | — | 1 | 4 | 98 | | |
| | | — | 1 | 10 | 97 | | |
| | | — | 3 | 1.5 | 97 | | |
| | | — | 5 | 2.5 | 96 | | |
| | 40 | 8 | 1 | 3.75 | 97 | | |
| | | 30 | 1 | 6 | 98 | | |
| | | ~100 | 1 | 12 | 97 | | |
| | 120 | 11 | 1 | 10 | 98 | | |

Figure 20:
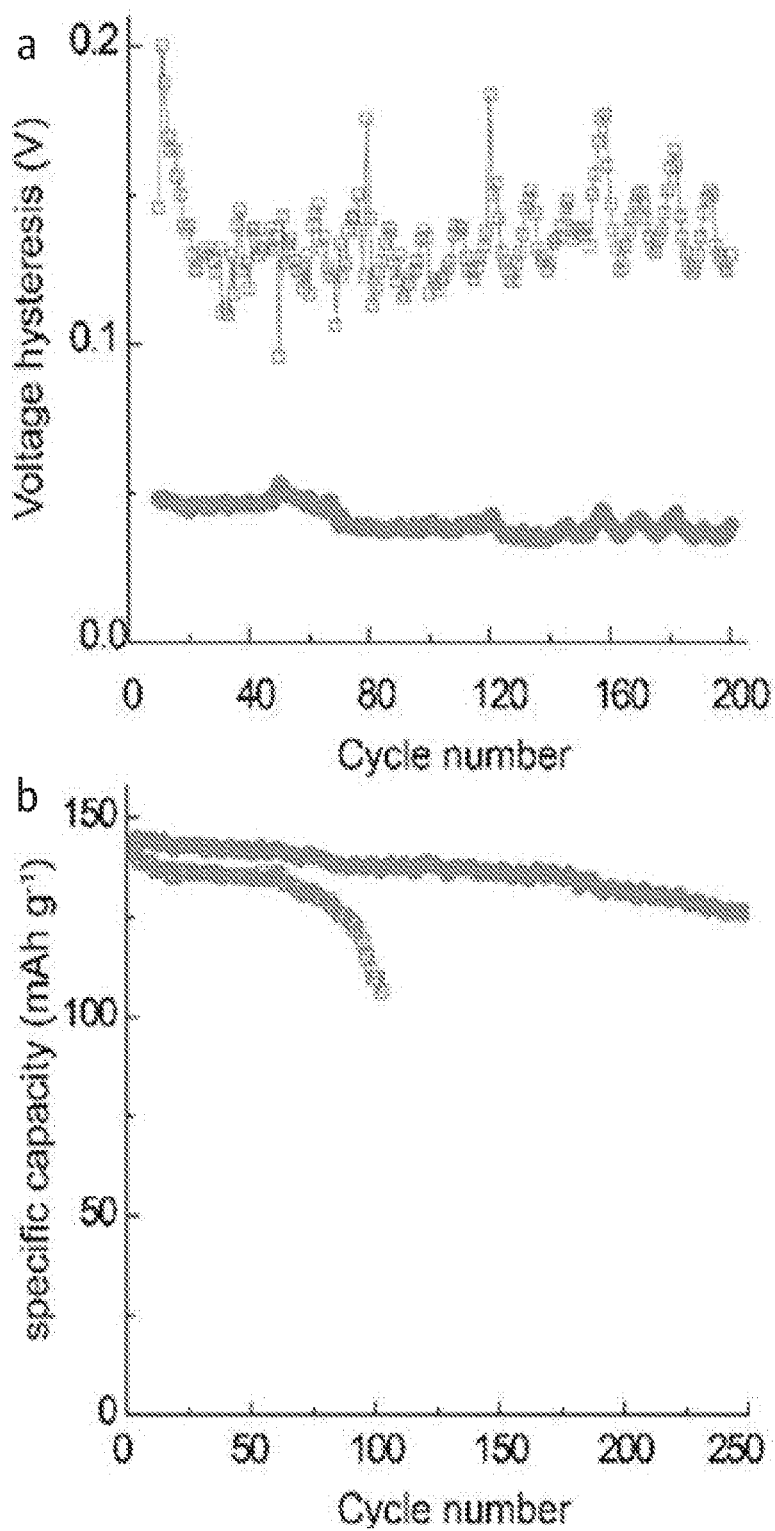
FIG. 20 shows electrochemical performance of the crumpled graphene ball electrodes for Li metal anodes. Panel (a) shows the voltage hysteresis of the Li deposition/dissolution process in the crumpled graphene ball electrodes and the controlled Cu electrodes at 0.5 mAh cm$^{-2}$. Panel (b) shows cycling performance of the LiFePO$_4$ cathode at 0.5 C in a full cell with the crumpled graphene ball electrodes and the controlled planar Cu electrodes as anodes.
Figure 21:
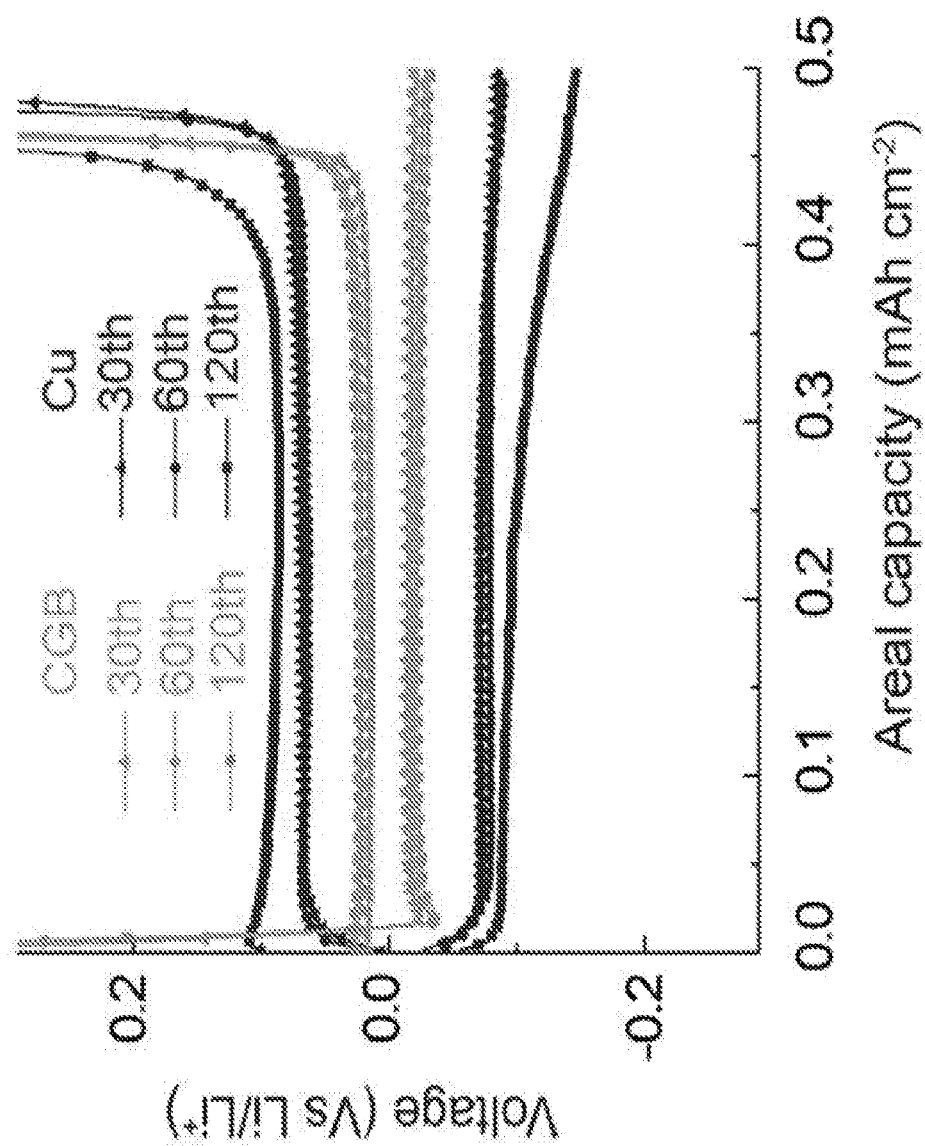
FIG. 21 shows voltage profiles of the Li deposition/dissolution process in the CGB electrodes and the controlled Cu electrodes at 0.5 mAh cm$^{-2}$.
Figure 22:
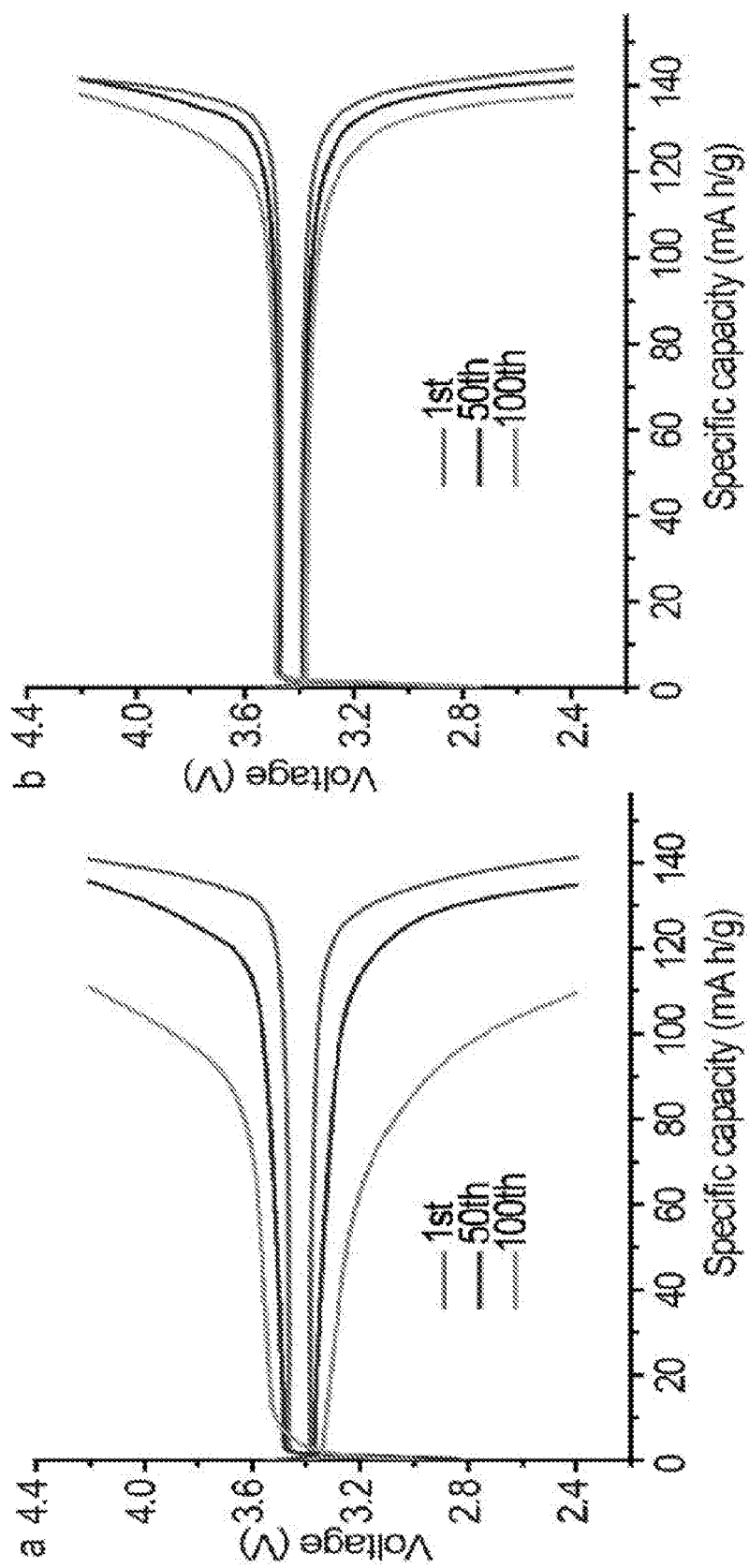
FIG. 22 shows voltage profiles of full-cell using Li—Cu (a), Li-CGB (b) anode and LiFePO$_4$ Cathode at rate of 0.5 C.

The lower impedance of the crumpled graphene balls leads to low polarization in charge-discharge voltage profile. Indeed, the voltage hysteresis, the difference between the Li plating/stripping voltage, is about 40 mV in average for the CGB coated electrode and about 160 mV for bare Cu, as shown in panel (a) of FIG. 20, and FIG. 21. Irregular fluctuation is also observed in the voltage hysteresis of Cu electrodes, again indicating unstable interface of Li on Cu and dendrite formation. With stable interface, the CGB electrode is assembled into a full cell against a LiFePO$_4$ cathode, as shown in panel (b) of FIG. 20, and FIG. 22. The battery can maintain the high capacity over 200 cycles. But the capacity of the bare Cu anode based cell decay quickly after 80 cycles.

In summary, the invention discloses, among other things, the crumpled graphene balls being a promising building block for constructing high performance scaffold for Li metal anodes. The crumpled graphene scaffold can be assembled on demand by simple solution-casting using arbitrary solvents. The resulting scaffold is conducting, lightweight, lithiophilic, chemically and mechanically robust. High Coulombic efficiency and stable cycling Li within the crumpled graphene scaffold is demonstrated. The performance is scalable 10 mAh cm$^{-2}$ for 120 μm crumpled graphene balls within tolerable volume fluctuation. Plating/stripping Li up to 12 mAh cm$^{-2}$ on 40 μm crumpled graphene electrode does not experience dendrite growth. This Li storage mode and scaffold structure design should pave the way for high energy density Li metal anodes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. Jacobson, A., Chianelli, R. & Whittingham, M. Amorphous molybdenum disulfide cathodes. *J. Electrochem. Soc.* 126, 2277-2278 (1979).

[2]. Adams, W. A., Donaldson G. J. & Stiles J. A. R. *Power Sources* 10. London: The Paul Press Ltd, p 69, (1984).

[3]. Whittingham, M. S. Electrical energy storage and intercalation chemistry. *Science* 192, 1126-1127 (1976).

[4]. Tarascon, J. M. & Armand, M. Issues and challenges facing rechargeable lithium batteries. *Nature* 414, 359-367 (2001).

[5]. Peled, E. The electrochemical behavior of alkali and alkaline earth metals in nonaqueous battery systems—the solid electrolyte interphase model. *J. Electrochem. Soc.* 126, 2047-2051 (1979).

[6]. Lu, Y., Tu, Z. & Archer, L. A. Stable lithium electrodeposition in liquid and nanoporous solid electrolytes. *Nat. Mater.* 13, 961-969 (2014).

[7]. Suo, L., Hu, Y. S., Li, H., Armand, M. & Chen, L. A new class of solvent-in-salt electrolyte for high-energy rechargeable metallic lithium batteries. *Nat. commun.* 4, 1481 (2013).

[8]. Ding, F, et al. Dendrite-free lithium deposition via self-healing electrostatic shield mechanism. *J. Am. Chem. Soc.* 135, 4450-4456 (2013).

[9]. Zheng, G, et al. Interconnected hollow carbon nanospheres for stable lithium metal anodes. *Nat. nanotech.* 9, 618-623 (2014).

[10]. Kim, J. S., Kim, D. W., Jung, H. T. & Choi, J. W. Controlled lithium dendrite growth by a synergistic effect of multilayered graphene coating and an electrolyte additive. *Chem. Mater* 27, 2780-2787 (2015).

[11]. Yan, K et al. Ultrathin two-dimensional atomic crystals as stable interfacial layer for improvement of lithium metal anode. *Nano Lett.* 14, 6016-6022 (2014).

[12]. Liang, Z. et al. Polymer nanofiber-guided uniform lithium deposition for battery electrodes. *Nano Lett.* 15, 2910-2916 (2015).

[13]. Cheng, X. B. et al. Dendrite-Free lithium deposition induced by uniformly distributed Lithium-ions for efficient lithium metal batteries. *Adv. Mater* 28, 2888-2895 (2016).

[14]. Bittihn, R., Herr, R. & Hoge, D. The SWING system, a nonaqueous rechargeable carbon/metal oxide cell. *J. Power Sources* 43, 223-231 (1993).

[15]. Sawai, K., Iwakoshi, Y. & Ohzuku, T. Carbon materials for lithium-ion (shuttlecock) cells. *Solid State Ionics* 69, 273-283 (1994).

[16]. Nagaura, T. & Tozawa, K. Lithium ion rechargeable battery. *Prog. Batteries Sol. Cells* 9, 209 (1990).

[17]. Armand, M. & Tarascon, J. M. Building better batteries. *Nature* 451, 652-657 (2008).

[18]. Whittingham, M. S. Lithium batteries and cathode materials. *Chem. Rev.* 104, 4271-4302 (2004).

[19]. Idota, Y., Kubota, T., Matsufuji, A., Maekawa, Y. & Miyasaka, T. Tin-based amorphous oxide: a high-capacity lithium-ion-storage material. *Science* 276, 1395-1397 (1997).

[20]. Boukamp, B., Lesh, G. & Huggins, R. All-solid lithium electrodes with mixed-conductor matrix. *J. Electrochem. Soc.* 128, 725-729 (1981).

[21]. Chan, C. K. et al. High-performance lithium battery anodes using silicon nanowires. *Nat. nanotech.* 3, 31-35 (2008).

[22]. Mizushima, K., Jones, P., Wiseman, P. & Goodenough, J. Li$_x$CoO$_2$ (0<x<1): A new cathode material for batteries of high energy density. *Mater Res. Bull.* 15, 783-789 (1980).

[23]. Padhi, A. K. and Goodenough, J. B. Phospho-olivines as positive-electrode materials for rechargeable lithium batteries. *J. Electrochem. Soc.* 144, 1188-1194 (1997).

[24]. Broussely, M., Biensan, P. & Simon, B. Lithium insertion into host materials: the key to success for Li ion batteries. *Electrochim. Acta* 45, 3-22 (1999).

[25]. Lin, D. et al. Layered reduced graphene oxide with nanoscale interlayer gaps as a stable host for lithium metal anodes. *Nat. nanotech.* 11, 626-632 (2016).

[26]. Yang, C. P., Yin, Y. X., Zhang, S. F., Li, N. W. & Guo, Y. G. Accommodating lithium into 3D current collectors with a submicron skeleton towards long-life lithium metal anodes. *Nat. commun.* 6, 8058 (2015).

[27]. Yun, Q. et al. Chemical dealloying derived 3D porous current collector for Li metal anodes. *Adv. Mater* 28, 6932-6939 (2016).

[28]. Chu, S. & Cui, Y. Selective deposition and stable encapsulation of lithium through heterogeneous seeded growth. *Nature Energy* 1, 16010 (2016).

[29]. Liu, Y., Lin, D., Liang, Z., Zhao, J., Yan, K. & Cui, Y. Lithium-coated polymeric matrix as a minimum volume-change and dendrite-free lithium metal anode. *Nat. commun.* 7, 10992 (2016).

[30]. Sun, Y., Liu, N. & Cui Y. Promises and challenges of nanomaterials for lithium-based rechargeable batteries. *Nature Energy* 1, 16071 (2016).

[31]. Lu, L. L. et al. Free-standing copper nanowire network current collector for improving lithium anode performance. *Nano lett.* 16, 4431-4437 (2016).

[32]. Aurbach, D., Zinigrad, E., Cohen, Y. & Teller, H. A short review of failure mechanisms of lithium metal and lithiated graphite anodes in liquid electrolyte solutions. *Solid State Ionics* 148, 405-416 (2002).

[33]. Bieker, G., Winter, M. & Bieker, P. Electrochemical in situ investigations of SEI and dendrite formation on the lithium metal anode. *Phy. Chem. Chem. Phy.* 17, 8670-8679 (2015).

[34]. Zhang, R. et al. Conductive nanostructured scaffolds render low local current density to inhibit lithium dendrite growth. *Adv. Mater.* 28, 2155-2162 (2016).

[35]. Liang, Z. et al. Composite lithium metal anode by melt infusion of lithium into a 3D conducting scaffold with lithiophilic coating. *Proc. Natl. Acad. Sci. U.S.A* 113, 2862-2867 (2016).

[36]. Luo, L. L., Wu, J. S., Luo, J. Y., Huang, J. X. & Dravid, V. P. Dynamics of electrochemical lithiation/delithiation of graphene-encapsulated silicon nanoparticles studied by in-situ TEM. *Sci Rep.* 4, 3863 (2014).

[37]. Luo, J. Y. et al. Compression and aggregation-resistant particles of crumpled soft sheets. *ACS Nano* 5, 8943-8949 (2011).

[38]. Ko, M. S., Chae, S. J., Ma, J. Y., Kim, N. H., Lee, H. W., Cui, Y. & Cho, J. Scalable synthesis of silicon-nanolayer-embedded graphite for high-energy Lithium-ion batteries. *Nature Energy* 1, 16113 (2016).

[39]. Hummers, W. S. & Offeman, R. E. Preparation of graphitic oxide. *J. Am. Chem. Soc.* 80, 1339-1342 (1958).

[40]. W. Xu, J. L. Wang, F. Ding, X. L. Chen, E. Nasybulin, Y. H. Zhang, J. G. Zhang, *Energy Environ. Sci.* 2014, 7, 513-537.

[41]. K. Zhang, G. H. Lee, M. Park, W. Li, Y. M. Kang, *Adv. Energy Mater* 2016, 6, 1600811.

[42]. J. B. Goodenough, *Acc. Chem. Res.* 2013, 46, 1053-1061.

[43]. X. Dou, A. R. Kolyonow, X. L. He, H. D. Jang, Q. Wang, Y.-W. Chung, J. X. Huang, *Proc. Natl. Acad. Sci.* 2016, 113, 1528-1533.

[44]. J. Y. Luo, J. Kim, J. X. Huang, *Acc. Chem. Res.* 2013, 46, 2225-2234.

[45]. J. Y. Luo, H. D. Jang, J. X. Huang. *ACS Nano* 2013, 7, 1464-1471.

[46]. J. Smith, Y. H. Chang, K. Raidongia, T. Y. Chen, L. J. Li, J. Huang, *Adv. Energy Mater* 2014, 4, 59-62.

[47]. J. Y. Luo, J. Gao, A. X. Wang, J. X. Huang, *ACS Nano* 2015, 9, 9432-9436.

[48]. R. Zhang, X. R. Chen, X. Chen, X. B. Cheng, X. Q. Zhang, C. Yan, Q. Zhang, *Angew. Chem. Int. Ed.* 2017, 56 (27), 7764-7768.

[49]. M. D. Tikekar, S. Choudhury, Z. Tu, L. A. Archer, *Nature Energy* 2016, 1, 16114.

[50]. Z. Tu, M. J. Zachman, S. Choudhury, S. Wei, Y. Yang, L. F. Kourkoutis, L. A. Archer, *Adv. Energy Mater* 2017, 7, 1602367.

[51]. T. T. Zuo; X. W. Wu, C. P. Yang, Y. X. Yin, H. Ye, N. W. Li, Y. G. Guo, *Advanced Materials* 2017, 29 (29), 1700389.

What is claimed is:

1. A host material for stabilizing a lithium (Li) metal electrode, comprising:
    a scaffold comprising crumpled graphene balls, defining volumes and voids inside and in between the crumpled graphene balls so as to allow uniform and stable Li deposition/dissolution inside and in between the crumpled graphene balls without electrode volume fluctuations or with sufficiently small electrode volume fluctuations,
    wherein the crumpled graphene balls have a surface area of about 382 m$^2$ g$^{-1}$ with a pore volume of about 1.823 cm$^3$ g$^{-1}$.

2. The host material of claim 1, wherein the crumpled graphene balls are paper ball-like graphene particles and are in submicron sizes.

3. The host material of claim 1, wherein the volumes and voids inside and in between the crumpled graphene balls are in submicron sizes.

4. The host material of claim 1, wherein the crumpled graphene balls are resistant to aggregation or deformation.

5. The host material of claim 1, wherein the crumpled graphene balls are lithiophilic with high Li diffusivity.

6. The host material of claim 1, wherein the crumpled graphene balls are conductive and chemically and mechanically stable.

7. The host material of claim 1, wherein in operation, Li ions are reversibly deposited or dissolved within the scaffold.

8. A lithium (Li) metal electrode, comprising:
    a scaffold formed of a host material comprising crumpled graphene balls, defining volumes and voids inside and in between the crumpled graphene balls, so as to allow uniform and stable Li deposition/dissolution inside and in between the crumpled graphene balls without electrode volume fluctuations or with sufficiently small electrode volume fluctuations.

9. The Li metal electrode of claim 8, wherein the volumes and voids inside and in between the crumpled graphene balls are in submicron sizes.

10. The Li metal electrode of claim 8, wherein the crumpled graphene balls have a surface area of about 382 m$^2$ g$^{-1}$ with a pore volume of about 1.823 cm$^3$ g$^{-1}$.

11. The Li metal electrode of claim 8, wherein the crumpled graphene balls are resistant to aggregation or deformation.

12. The Li metal electrode of claim 8, wherein the crumpled graphene balls are lithiophilic with high Li diffusivity.

13. The Li metal electrode of claim 8, wherein the crumpled graphene balls are conductive and chemically and mechanically stable.

14. The Li metal electrode of claim 8, wherein in operation, Li ions are reversibly deposited or dissolved within the scaffold.

15. An energy storage device, comprising a lithium (Li) metal electrode of claim 8.

16. The energy storage device of claim 15, wherein the scaffold is a conducting, lightweight and lithiophilic scaffold that operably stabilizes high loading of Li during cycling and avoids its dendritic filament growth.

17. The energy storage device of claim 15, wherein the energy storage device has a performance with scalable Li loading up to about 10 mAh cm$^{-2}$ for the Li metal electrode with a thickness of about 120 μm within tolerable volume fluctuation.

18. The energy storage device of claim 15, wherein the energy storage device has a performance with a stable Coulombic efficiency of about 97.5% over about 750 cycles.

19. The energy storage device of claim 15, wherein the energy storage device has a performance with plating/stripping Li up to about 12 mAh cm$^{-2}$ on the Li metal electrode with a thickness of about 40 μm without dendrite growth.

20. The energy storage device of claim 15, being a battery.

* * * * *